(12) United States Patent
Palombini et al.

(10) Patent No.: US 12,077,060 B1
(45) Date of Patent: Sep. 3, 2024

(54) SYSTEMS AND METHODS FOR AIRCRAFT TRACKING

(71) Applicant: BETA AIR, LLC, South Burlington, VT (US)

(72) Inventors: John Charles Palombini, South Burlington, VT (US); Daniel Russell, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 18/203,927

(22) Filed: May 31, 2023

(51) Int. Cl.
| | | |
|---|---|---|
| *B60L 53/66* | (2019.01) | |
| *B60L 53/37* | (2019.01) | |
| *B60L 53/68* | (2019.01) | |
| *B64U 50/37* | (2023.01) | |
| *B64U 50/38* | (2023.01) | |

(52) U.S. Cl.
CPC .............. *B60L 53/66* (2019.02); *B60L 53/37* (2019.02); *B60L 53/68* (2019.02); *B64U 50/37* (2023.01); *B64U 50/38* (2023.01)

(58) Field of Classification Search
CPC ................................ B64U 50/37; B64U 50/38
See application file for complete search history.

(56) References Cited

U.S. PATENT DOCUMENTS

| | | | |
|---|---|---|---|
| 5,714,948 | A | 2/1998 | Farmakis |
| 10,490,086 | B1 | 11/2019 | Baker |
| 2016/0039542 | A1* | 2/2016 | Wang ............... B64C 39/024 244/114 R |
| 2017/0015415 | A1* | 1/2017 | Chan ............... B64C 39/024 |
| 2018/0061243 | A1 | 3/2018 | Shloosh |
| 2020/0207230 | A1* | 7/2020 | Evans ............... B60L 53/34 |
| 2020/0388171 | A1 | 12/2020 | Nix |

FOREIGN PATENT DOCUMENTS

| | | |
|---|---|---|
| CN | 113990114 A | 1/2022 |
| DE | 102020105275 A1 * | 9/2021 |

OTHER PUBLICATIONS

Machine translation of DE-102020105275-A1 (Year: 2023).*
Welcome to Mosaic ATM's Airport Viewer!; (website); https://www.airportviewer.com/.

* cited by examiner

*Primary Examiner* — David V Henze-Gongola
(74) *Attorney, Agent, or Firm* — Lee & Hayes, P.C.

(57) ABSTRACT

Disclosed herein are systems and methods for tracking an aircraft on a ramp. A system may receive a location datum and display the location datum to a user device. A location datum may include a machine vision datum.

20 Claims, 11 Drawing Sheets

SYSTEMS AND METHODS FOR AIRCRAFT TRACKING

FIELD OF THE INVENTION

The present invention generally relates to the field of aircraft tracking. In particular, the present invention is directed to systems and methods for aircraft tracking.

BACKGROUND

Current methods for tracking aircraft traffic on a ramp are insufficient. There is a need for a system capable of tracking aircraft and aircraft utilization of various locations on a ramp.

SUMMARY OF THE DISCLOSURE

In an aspect, an apparatus for tracking an aircraft the apparatus includes at least a processor; and a memory communicatively connected to the at least processor, the memory containing instructions configuring the at least processor to receive a location datum, wherein the location datum indicates a position of an aircraft on a ramp; receive a pecuniary rate; and determine a pecuniary datum as a function of the location datum and the pecuniary rate; communicate the pecuniary datum to a user device.

In another aspect, a method of tracking an aircraft includes receiving, using at least a processor, a location datum, wherein the location datum indicates a position of an aircraft on a ramp; using the at least a processor, receiving a pecuniary rate; using the at least a processor, determining a pecuniary datum as a function of the location datum and the pecuniary rate; and using the at least a processor, communicating the pecuniary datum to a user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for aircraft tracking. Aircraft may include electric aircraft. Systems for aircraft tracking may include a location data source, which may transmit a location datum to a processor. A location datum may include a datum describing a location of an aircraft. A location datum may include, as non-limiting examples, a machine vision datum, an automatic broadcast datum, a Wi-Fi datum, a radio datum, a vehicle ID datum, a public database datum, and a charging system datum. A machine learning model may be used to analyze a location datum, such as to determine the location of an aircraft in a picture or to identify an aircraft in a picture. A processor may receive a pecuniary rate from a pecuniary rate source. A processor may determine a pecuniary datum as a function of the pecuniary rate and the location datum. A processor may communicate a pecuniary datum to a user device. A processor may receive a response from a user device.

Figure 1:
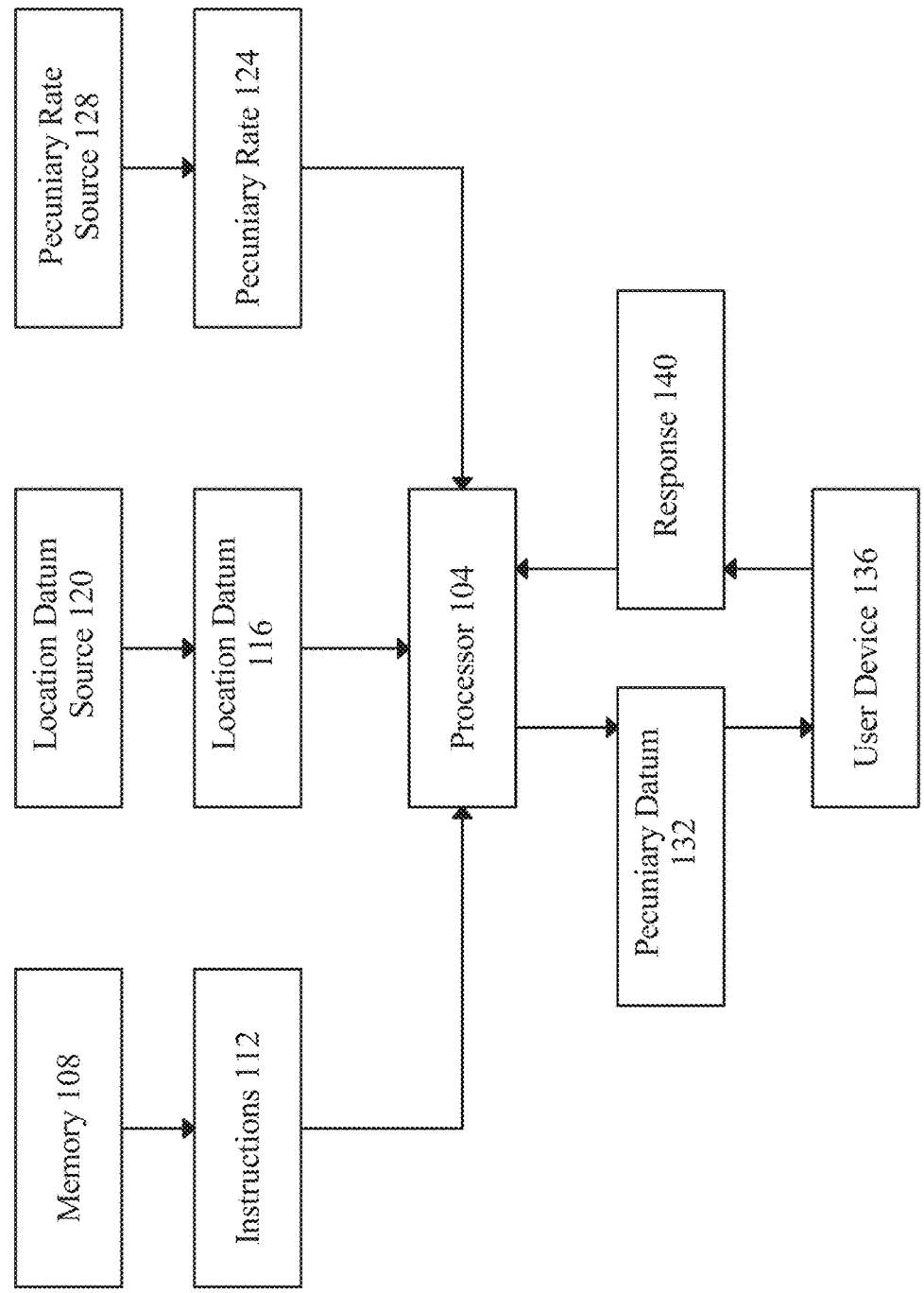
FIG. 1 is a diagram depicting an exemplary apparatus for aircraft tracking.

Referring now to FIG. 1, an exemplary embodiment of an apparatus for aircraft tracking is illustrated. An apparatus may include a computing device. An apparatus may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

Still referring to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, an apparatus 100 may include a computing device. A computing device may include at least a processor 104 and memory 108 communicatively connected to the at least processor, the memory 108 containing instructions 112 configuring the at least processor to perform a process described herein. Computing devices are described in further detail herein.

Still referring to FIG. 1, a processor 104 may be configured to receive a location datum 116 from a location datum source 120. Processor 104 may be communicatively connected to a location datum source 120. An apparatus 100 may include at least a processor 104 and memory 108 communicatively connected to the at least processor 104, the memory 108 containing instructions 112 configuring the at least processor 104 to receive a location datum 116 from a location datum source 120.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, as used herein, a "location datum" is a datum describing the location of an aircraft. As used herein, a "ramp" is a location on the ground of an aircraft landing facility in which an aircraft may be parked. As used herein, a "landing facility" is a location for the landing and departure of VTOL aircraft. A landing facility may include a vertiport, heliport, seaport, airport, facilities, and terminals for the accommodation of passengers and/or cargo carried by means of air transport, and the like. In some embodiments, location datum 116 may include a datum selected from the list consisting of a machine vision datum, an automatic broadcast datum, a Wi-Fi datum, a radio datum, a vehicle ID datum, and a public database datum. As used herein, a "location datum source" is a device for recording, storing, or transmitting a location datum. Location datum source 120 may include, in non-limiting examples, a machine vision camera, a radio receiver, or a computing device connected to a Wi-Fi network. Location datum source 120 may be configured to detect the presence of an aircraft, location of an aircraft, and/or identification of an aircraft. In some embodiments, location datum 116 may be associated with a time datum, such as a timestamp. As used herein, a "time datum" is a datum describing a time associated with location datum 116. In non-limiting examples, a time datum may include a time at which location datum 116 was recorded, transmitted, or received. In some embodiments, location datum source 120 may transmit a time datum associated with location datum 116 to processor 104. In some embodiments, processor 104 may determine a time datum upon receipt of location datum 116. In some embodiments, a time datum associated with location datum 116 may be used to determine when an aircraft arrives at and/or departs from a location of interest, as described further herein.

Still referring to FIG. 1, location datum 116 may include a datum describing an aircraft positioned in a location of interest. In non-limiting examples, a location of interest may include a terminal, gate, charging station, ramp, runway, aircraft maintenance facility, or aircraft storage facility.

Still referring to FIG. 1, in some embodiments, an aircraft is an electric aircraft. Aircraft and electric aircraft are described further with reference to FIG. 2.

Still referring to FIG. 1, processor 104 may be configured to receive location datum 116 from location datum source 120 through a signal. As used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus may perform one or more signal processing steps on a signal. For instance, apparatus may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, location datum 116 may include a machine vision datum. As used herein, a "machine vision datum" is a datum produced by a machine vision camera. An apparatus 100 may include one or more machine vision cameras configured to capture machine vision datum. Machine vision datum may include a digitized scene of the landing facility. A "machine vision camera," as used herein, is a device enabled with machine vision for recording visual images. Images may include photographs, film, or video signals. Machine vision camera may include thermal imaging, infrared, enhanced vision system, spark optical emission, video surveillance types of cameras and the like. In some embodiments, a machine vision camera may include a stereo-camera. As used in this disclosure, a "stereo-camera" is a camera that senses two or more images from two or more vantages. As used in this disclosure, a "vantage" is a location of a camera relative to a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm. A machine vision camera may include a thermal imaging camera. Thermal imaging may give the advantage of detecting aircrafts hidden out of plain view of the camera by an object, such as another aircraft.

Still referring to FIG. 1, a machine vision system may use images from at least a camera as described above, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ¢ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, processor 104 may receive location datum 116 from a camera database communicatively connected to processor 104 and machine vision cameras. A "camera database," as used herein, is a data structure populated with data received from a camera. In some embodiments, camera database may include an identification of each camera transmitting traffic, such as a serial number and location associated with each camera. Databases as disclosed herein may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a machine vision camera is configured to perform optical character recognition. In some embodiments, processor 104 is configured to perform optical character recognition. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, location datum 116 may include an automatic broadcast datum. In some embodiments, a location data source 120 may include a device configured to receive an automatic broadcast datum. As used herein, an "automatic broadcast datum" is a datum automatically broadcast by an aircraft describing its own location. In some embodiments, an automatic broadcast datum includes an Automatic Dependent Surveillance-Broadcast (ADS-B) signal. In some embodiments, an aircraft may determine its own position, such as using data from satellites, and periodically broadcast its position in the form of ADS-B signal. ADS-B signal may include aircraft identification information. ADS-B signal may be used to determine presence, location, and identification of an aircraft. In some embodiments, an ADS-B signal may include information on the location of aircraft other than the broadcasting aircraft. In a non-limiting example, a first aircraft may broadcast a first ADS-B signal, which is received by a second aircraft, and the second aircraft may broadcast a second ADS-B signal describing the locations of both aircraft. In some embodiments, a location data source may include a device configured to receive an ADS-B signal.

Still referring to FIG. 1, in some embodiments, location datum 116 may include a Wi-Fi datum. In some embodiments, a location data source 120 may include a device configured to receive Wi-Fi data, such as a computing device, router, or modem. As used herein, a "Wi-Fi datum" is a datum broadcast by an aircraft over a Wi-Fi network. In some embodiments, a Wi-Fi datum may include aircraft identifying information. In non-limiting examples, a Wi-Fi datum may include the tail number, make, owner, and/or pilot of an aircraft. In some embodiments, the position of an aircraft may be determined using a Wi-Fi connection. In some embodiments, the position of an aircraft may be determined based on the intensity of one or more Wi-Fi signal. In some embodiments, a stronger Wi-Fi signal is associated with a position closer to the receiving device. In some embodiments, the source of a Wi-Fi signal may be determined based on a digital fingerprint. In some embodiments, an aircraft may broadcast a MAC ID address over Wi-Fi, allowing it to be identified. In some embodiments, a digital fingerprint and a Wi-Fi signal strength may be used to determine the position of an aircraft. In some embodiments, a Wi-Fi datum may include data broadcast by an aircraft describing its own position over a Wi-Fi network.

Still referring to FIG. 1, in some embodiments, location datum 116 may include a radio datum. In some embodiments, a location data source 120 may include a device configured to receive a radio signal. As used herein, a "radio datum" is a datum broadcast by an aircraft using a radio transmitter. In some embodiments, a radio datum may include aircraft identifying information. In non-limiting examples, a radio datum may include the tail number, make, owner, and/or pilot of an aircraft. In some embodiments, the position of an aircraft may be determined based on a radio signal broadcast by an aircraft. In some embodiments, a radio signal broadcast by an aircraft may include speech describing the location of the aircraft. In some embodiments, speech, such as speech transmitted using radio, may be analyzed to determine the location of an aircraft.

Still referring to FIG. 1, in some embodiments, a language model may be used to analyze speech. As used herein, a "language model" is a program capable of interpreting natural language. A language model may include a machine learning model, such as a neural network. A language model may be trained to using a dataset including natural language. A language model may accept as an input a radio datum and may output an interpretation of speech included in the radio datum, such as a transcript or a position of an aircraft discussed in the speech.

Still referring to FIG. 1, in some embodiments, location datum 116 may include a charging system datum. As used herein, a "charging system datum" is a datum associated with the use of an electric aircraft charging system. In some embodiments, a location data source 120 may include an electric aircraft charging system. Electric aircraft charging systems are described herein with reference to FIG. 6. In some embodiments, an electric aircraft charging system may be configured to transmit a signal to processor 104 indicating that the electric aircraft charging system is in use. In a non-limiting example, an electric aircraft charging system may be configured to transmit a signal to processor 104 indicating that the electric aircraft charging system is being used to charge an aircraft. In some embodiments, an electric aircraft charging system may be configured to transmit a signal to processor 104 describing an aspect of electric aircraft charging system use. In non-limiting examples, an electric aircraft charging system may be configured to transmit a signal to processor 104 describing the amount of energy provided to an electric aircraft, the amount of time an electric aircraft charging system is used by an electric aircraft, or the amount of time an electric aircraft charging system was idle. In non-limiting examples, an electric aircraft charging system may be configured to transmit a signal to processor 104 including timestamps for when electric aircraft charging system started and stopped charging an aircraft. In some embodiments, an electric aircraft charging system may be configured to receive a vehicle ID from an aircraft connected to the electric aircraft charging system. In some embodiments, an electric aircraft charging system may be configured to transmit a vehicle ID to processor 104. In some embodiments, processor 104 may determine the location and/or status of a vehicle associated with a vehicle ID received from an electric aircraft charging system based on this communication.

Still referring to FIG. 1, in some embodiments, processor 104 may request an additional location datum 116 based on receipt of a charging system datum. In a non-limiting example, processor 104 may request a machine vision datum from a machine vision camera as a result of a charging system datum indicating that an electric aircraft charging system is in use; in this case, a machine vision datum may be used to determine the identity of an aircraft using the electric aircraft charging system or verify that an aircraft is using the electric aircraft charging system.

Still referring to FIG. 1, in some embodiments, location datum 116 may include a near field communication (NFC) datum. As used herein, a "NFC datum" is a datum transmitted using NFC protocols. In some embodiments, NFC enables communication between electric devices in close proximity. In some embodiments, NFC communication complies with standards set by the NFC Forum. In some embodiments, an NFC datum may be transmitted from an aircraft to location datum source 120 in close proximity to the aircraft. In some embodiments, an NFC datum may be transmitted from a device associated with an aircraft. In a non-limiting example, an NFC datum may be transmitted by a device associated with an aircraft's pilot, such as a smartphone.

Still referring to FIG. 1, in some embodiments, location datum 116 may include a public database datum. In some embodiments, a location data source 120 may include a device configured to receive a database datum from a public database. As used herein, a "public database datum" is a datum transmitted from a public database. In some embodiments, a public database includes flight plan data. In a non-limiting example, a public database may include information collected from ADS-B broadcasts. In a non-limiting example, a public database may include a FlightAware database. In some embodiments, processor 104 may be configured to request data from a public database through an application programming interface (API). In some embodiments, processor 104 may be configured to receive data in response to an API request. In a non-limiting example, processor 104 may be configured to request a database datum from a public database through an API associated with that public database, then receive the database datum from the public database, or a computing device associated with the public database.

Still referring to FIG. 1, in some embodiments, processor 104 may receive location data from more than one location datum source 120. In some embodiments, processor 104 may receive location data from a second location datum source 120 when location datum 116 from a first location datum source 120 is unavailable. In a non-limiting example, a first location datum source 120 may include a camera, and a large aircraft may block the camera; in this situation, processor 104 may receive location datum 116 as to other aircraft using a second camera or other forms of location data, such as ADS-B or Wi-Fi. In some embodiments, processor 104 may resolve inconsistent location data using additional location data. In some embodiments, processor 104 may resolve inconsistent location data using location datum 116 from a more reliable source. In some embodiments, processor 104 may verify the location, status and/or identity of an aircraft using more than one location datum 116. In a non-limiting example, processor 104 may receive a first location datum 116 from a machine vision camera and a second location datum 116 from a computing device connected to a Wi-Fi network and may verify the accuracy of the first location datum 116 using the second location datum 116. In some embodiments, processor 104 may determine the identity of an aircraft or verify the identity of an aircraft by matching a flight plan or booking to information received from the aircraft. In non-limiting examples, the identity of an aircraft may be verified based on a tail number, flight number, pilot, or verification code. In a non-limiting example, the identity of an aircraft may be verified based on information transmitted by the aircraft using ADS-B. In a non-limiting example, the identity of an aircraft may be verified based on an identifying feature of the aircraft captured by a machine vision camera.

Still referring to FIG. 1, processor 104 may be configured to receive a pecuniary rate 124 from a pecuniary rate source 128. Processor 104 may be communicatively connected to pecuniary rate source 128. An apparatus 100 may include at least a processor 104 and memory 108 communicatively connected to the at least processor 104, the memory 108 containing instructions 112 configuring the at least processor 104 to receive pecuniary rate 124 from pecuniary rate source 128.

Still referring to FIG. 1, as used herein, as used herein, a "pecuniary rate" is one or more costs and/or rates associated with the use of the location of interest. In some embodiments, pecuniary rate 124 may include a flat fee. In non-limiting examples, pecuniary rate 124 may include a flat fee for entering a location of interest, or for starting to charge an aircraft using an electric aircraft charging system in the location of interest. In some embodiments, pecuniary rate 124 may include a fee calculated as a function of a variable. In non-limiting examples, pecuniary rate 124 may include a fee based on the amount of time an aircraft spends in a location of interest, or the amount of time an aircraft spends drawing power from an electric aircraft charging system. Pecuniary rate 124 may include one or more costs associated with starting to use a service, the amount of service used, the amount of time the service is used for, occupying a space the service is offered in, and the like. As a non-limiting example, pecuniary rate 124 may include a first cost associated with starting to use an electric aircraft charging system, and a second cost associated with the amount of time an aircraft used the electric aircraft charging system. As another non-limiting example, pecuniary rate 124 may include a cost associated with how long an aircraft spends in a hangar. In some embodiments, pecuniary rate 124 may include a function of the amount of time an aircraft spends using a location of interest or in a location of interest; in such a situation, pecuniary datum 132 may be calculated as a function of a time datum associated with location datum 116 as described herein. In some embodiments, pecuniary rate 124 may include a function of when a location of interest is used or occupied relative to other aircraft traffic. In a non-limiting example, pecuniary rate 124 may include a first fee applicable to a time of day when a location of interest is typically not in high demand, and a second fee applicable to a time of day when a location of interest is typically in high demand; in such a situation, a time datum associated with location datum 116 may be used to calculate pecuniary datum 132.

Still referring to FIG. 1, pecuniary rate 124 may be associated with use of one or more services offered by a fixed base operator (FBO). As non-limiting examples, pecuniary rate 124 may be associated with use of aircraft storage, aircraft maintenance, aircraft repair, use of a runway, and charging electric and/or hybrid aircraft. In some embodiments, pecuniary rate 124 may include a fee selected from the list consisting of a ramp fee, a hangar fee, a landing fee, an overnight fee, a facility fee, an after hours fee, a tie down fee, a handling fee, a parking fee, a GPU fee, a lavatory fee, an infrastructure fee, a deicing fee, a preheat fee, a service fee, a drop off fee, a security fee, a quick turn fee, a same day return ramp fee, an international trash fee, a call out fee, a potable water fee, a special event fee, an airport and operations fee, a terminal fee, a departure fee, a camping fee, a trash fee, a towing fee, a seaplane dock fee, a seaplane ramp fee, a city fee, a county fee, and an authority fee.

Still referring to FIG. 1, in some embodiments, pecuniary rate source 128 may include a database. In a non-limiting example, processor 104 may be configured to request pecuniary rate 124 from an API associated with pecuniary rate source 128 including a database, and may be configured to receive pecuniary rate 124 from pecuniary rate source 128. In some embodiments, pecuniary rate source 128 may include memory 108. In a non-limiting example, processor 104 may be configured to look up pecuniary rate 124 from a table stored in pecuniary rate source 128 including memory 112. In some embodiments, processor 104 may be configured to receive elements of pecuniary rate 124 from multiple pecuniary rate sources 128. In a non-limiting example, processor 104 may be configured to request a first cost associated with the amount of time an aircraft used an electric aircraft charging system from first pecuniary rate source 128 including memory 112, and may be configured to request a second cost associated with the amount of energy an aircraft drew from electric aircraft charging system from second pecuniary rate source 128 including a database, and processor 104 may be configured to receive elements of pecuniary rate 124 from each pecuniary rate source.

Still referring to FIG. 1, processor 104 may be configured to determine a pecuniary datum 132 as a function of location datum 116 and pecuniary rate 124. An apparatus 100 may include at least a processor 104 and memory 108 communicatively connected to the at least processor 104, the memory 108 containing instructions 112 configuring the at least processor 104 to determine pecuniary datum 132 as a function of location datum 116 and pecuniary rate 124.

Still referring to FIG. 1, as used herein, a "pecuniary datum" is a cost of an aircraft occupying and/or using a location of interest. In some embodiments, pecuniary datum 132 may be determined as a function of a time datum associated with location datum 116. In some embodiments, processor 104 may receive a first location datum 116 associated with a first time datum and a second location datum 116 associated with a second time datum. In some embodiments, a first time datum is associated with when an aircraft entered a location of interest or started using a service offered in a location of interest. In some embodiments, a second time datum is associated with when an aircraft departed a location of interest or stopped using a service offered in a location of interest. In some embodiments, the duration an aircraft stayed in a location of interest or used a service offered in a location of interest may be calculated based on the difference between a time datum associated with a first location datum 116 and a time datum associated with a second location datum 116. In some embodiments, pecuniary datum 132 may be determined as a function of the duration an aircraft stayed in a location of interest and/or used a service offered in a location of interest. In a non-limiting example, pecuniary rate 124 may indicate that there is a cost for each hour that an aircraft stays in a location of interest, and pecuniary datum 132 may be determined as a function of the number of hours that an aircraft stayed in the location of interest, which may be determined based on a time datum associated with location datum 116.

Still referring to FIG. 1, in some embodiments, processor 104 determines pecuniary datum 132 as a function of data obtained from an electric aircraft charging system. In some embodiments, processor 104 may receive a signal from electric aircraft charging system indicating that electric aircraft charging system is in use; in some embodiments, such a signal may include a timestamp. In some embodiments, processor 104 may receive a signal from electric aircraft charging system describing an aspect of electric aircraft charging system use. In a non-limiting example, processor 104 may receive a signal from electric aircraft charging system describing the amount of energy provided to an electric aircraft, and processor 104 may determine pecuniary datum 132 as a function of the amount of energy provided to the electric aircraft, such as using a rate per unit of energy. In another non-limiting example, processor 104 may receive a signal from electric aircraft charging system describing the amount of time an electric aircraft charging system is used by an electric aircraft, and processor 104 may determine pecuniary datum 132 as a function of the amount of time electric aircraft charging system is used by the electric aircraft, such as using a rate per minute of electric aircraft charging system use.

Still referring to FIG. 1, processor 104 may be configured to communicate pecuniary datum 132 to user device 136. An apparatus 100 may include at least a processor 104 and memory 108 communicatively connected to the at least processor 104, the memory 108 containing instructions 112 configuring the at least processor 104 to communicate pecuniary datum 132 to user device 136.

Still referring to FIG. 1 user device 136 may include, in non-limiting examples, a smartphone, tablet, computer, or a flight controller, or pilot display associated with an aircraft. User device 136 may include a display. User device 136 may communicate pecuniary datum 132 to a user using a display. As used herein, a "display" is a device configured to communicate information to a user visually and/or using sound. A display may include a graphical user interface. As used herein, a "graphical user interface" (GUI) is a graphical form of user interface that allows users to interact with electronic devices. Visual communication by a display may include, without limitation, written or digital text, video, or images. Audio communication by a display may include, without limitation, machine generated speech.

Still referring to FIG. 1, processor 104 may communicate pecuniary datum 132 to user device 136 as part of a report. In some embodiments, a report may identify each item included in pecuniary datum 132. In a non-limiting example, a report may identify each location of interest entered, location of interest used, and/or service used, each applicable pecuniary rate 124, and how pecuniary datum 132 was calculated. In some embodiments, a report may combine one or more items included in pecuniary datum 132. In some embodiments, a report may combine one or more items of a similar type included in pecuniary datum 132. As a non-limiting example, pecuniary datum 132 may include a first fee for entering a location of interest, and a second fee for each hour spent in the location of interest; in this case, a report may add the first fee and the second fee and identify the sum as the fee for use of the location of interest in a report. As another non-limiting example, pecuniary datum may include a first fee for a first use of an electric aircraft charging system, and a second fee for a second use of an electric aircraft charging system; in this case, a report may add the first fee and the second fee and identify the sum as the fee for use of the electric aircraft charging system in a report. In some embodiments, a report may combine one or more fees of a first category, and identify the sum of those fees, and a report may keep one or more fees of a second category separate. As a non-limiting example, a report may identify a single fee associated with use of a first location of interest, and a second fee associated with use of a second location of interest. In some embodiments, a report may add all items of pecuniary datum 132 and identify a single fee.

Still referring to FIG. 1, processor 104 may be configured to receive a response 140 from user device 136. An apparatus 100 may include at least a processor 104 and memory 108 communicatively connected to the at least processor 104, the memory 108 containing instructions 112 configuring the at least processor 104 to receive response 140 from user device 136.

Still referring to FIG. 1, as used herein, a "response" is an input received from a user and/or user device in reply to receipt of a pecuniary datum. Response 140 may be received, in non-limiting examples, using Wi-Fi, NFC, or through an electric aircraft charging system. In some embodiments, response 140 is received automatically from an aircraft. Response 140 may include an identification which may include, in non-limiting examples, a billing address, cryptocurrency wallet, and/or an account associated with a service that facilitates payment. In some embodiments, response 140 may include a payment, method of payment, and/or identification. Response 140 may include a method of payment which may include, in non-limiting examples, credit card information, debit card information, banking information, and/or cryptocurrency account information. In some embodiments, response 140 may include a dispute over pecuniary datum 132 and/or an element of data used to determine pecuniary datum 132.

Still referring to FIG. 1, processor 104 may be configured to communicate a pecuniary request. An apparatus 100 may include at least a processor 104 and memory 108 communicatively connected to the at least processor 104, the memory 108 containing instructions 112 configuring the at least processor 104 to communicate a pecuniary request.

Still referring to FIG. 1, as used herein, a "pecuniary request" is a request for payment. In some embodiments, a pecuniary request may include a request for payment of pecuniary datum 132. Still referring to FIG. 1, in some embodiments, processor 104 may communicate a pecuniary request to a computing device. In some embodiments, processor 104 may communicate a pecuniary request to a computing device controlled by a financial institution or other provider of financial payment services. In non-limiting examples, processor 104 may communicate a pecuniary request including user credit card information and pecuniary datum 132 to a financial institution.

Still referring to FIG. 1, in some embodiments, processor 104 may communicate a pecuniary request in reply to response 140. In a non-limiting example, processor 104 may communicate to user device 136 pecuniary datum 132, receive from user device 136 response 140 including credit card information, and communicate a pecuniary request including the credit card details and pecuniary datum 132 to a financial institution. In some embodiments, processor 104 may communicate a pecuniary request without first receiving response 140. In some embodiments, processor 140 may look up user financial information from a database and automatically communicate a pecuniary request using the user financial information. In a non-limiting example, a user may provide automatic payment authorization and financial information, the financial information may be stored in a database, processor 140 may look up user financial information from a database and automatically communicate a pecuniary request using the financial information.

Still referring to FIG. 1, processor 104 may be configured to communicate location datum 116 to user device 136. Processor 104 may be communicatively connected to user device 136. An apparatus 100 may include at least a processor 104 and memory 108 communicatively connected to the at least processor 104, the memory 108 containing instructions 112 configuring the at least processor 104 to communicate location datum 116 to user device 136.

Still referring to FIG. 1, in some embodiments, processor 104 may determine whether to communicate location datum 116 to user device 136. In some embodiments, processor 104 may determine to communicate location datum 116 to user device 136 where processor 104 receives inconsistent location data. In some embodiments, processor 104 may determine to communicate location datum 116 to user device 136 based on the output of an anomaly machine learning model. In some embodiments, processor 104 may determine to display location datum 116 to user device 136 based on user input.

Still referring to FIG. 1, in some embodiments, processor 104 may determine to communicate location datum 116 to user device 136 where processor 104 has received inconsistent location data.

Still referring to FIG. 1, in some embodiments, processor 104 may determine to communicate location datum 116 to user device 136 based on an output of an anomaly machine learning model. In some embodiments, an anomaly machine learning model may be trained to detect anomalies in location data. In some embodiments, an anomaly machine learning model may be trained on a dataset including location data, where anomalies in the location data are tagged. In some embodiments, an anomaly machine learning model may be trained on a dataset including historical location data. In some embodiments, an anomaly machine learning model may accept as an input location data and may, as an output, determine whether the location data includes an anomaly. In some embodiments, anomaly machine learning model may include a classifier. An anomaly may include, as non-limiting examples, an aircraft entering an unintended location, or inconsistent location data.

Still referring to FIG. 1, in some embodiments, processor 104 may determine to communicate location datum 116 to user device 136 where processor 104 has received an input from the user, such as an input from the user requesting the location datum 116. User may input information using, as non-limiting examples, a smartphone, tablet, or computer.

Still referring to FIG. 1, processor 104 may be configured to generate a plurality of determinations based on the location datum 116 received. For example, processor 104 may determine traffic moment in regard to how many aircrafts are on the ramp, aircrafts that have left the ramp, when aircrafts have left the ramp, and the like based on location data, such as images and timestamps captured by one or more machine vision cameras. In some embodiments, determining traffic movement may include generating a bounding box of an aircraft or a plurality of aircrafts depicted in images received from machine vision camera utilizing a machine-learning process. A "bounding box," as used herein, is an abstract rectangle that acts as a reference point for object detection and produces a collision box for that object. In some embodiments, bounding boxes may be generated by an annotator and used as training data for a machine-learning model for object detection and target recognition. For example, a machine-learning model may be trained with a plurality of boundary tracking the arrival, stay and departure of an aircraft from a landing facility, in order produce for autonomous detection of traffic movement by the processor 104. In some embodiments, processor 104 may utilize optical character recognition techniques to extract text or symbols within the bounding boxes. For example, extracting the tail number of an aircraft departing from the ramp/landing facility. Such extractions using bounding boxes and optical character recognition may be used as input or as training data for an aircraft classifier as described further below.

Still referring to FIG. 1, in some embodiments, determining traffic movement may include a machine-learning model, such as an aircraft classifier as described further below. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, an "aircraft classifier," as used herein is a classifier configured to match location datum 116 to an aircraft. In a non-limiting example, a timestamp of an image depicting an aircraft has left the ramp or landing facility may be classified to the tail number of the aircraft depicted to the image. In some embodiments, aircraft classifier training data may include outputs of an optical character recognition technique (e.g., tail number) correlated to a boundary box of an aircraft. Training data may include object detection and movement tracking of a plurality of aircrafts based on a plurality of boundary boxes. In some embodiments, training data may include exemplary boundary boxes of a plurality of aircrafts as described above. Aircraft classifier may receive location datum 116, such as a plurality of images captured over a duration of time (i.e., 1 hour) by one or more machine-vision cameras and the corresponding timestamp of each image as an input and output the traffic movement 120 of each aircraft depicted.

Still referring to FIG. 1, processor 104 may be configured to determine an aircraft pattern of an aircraft. An "aircraft pattern," as used herein, is the typical traffic movement of an aircraft at a landing facility. For example, aircraft A may have pattern of early arrival and late departures from a landing facility. Processor 104 may train and utilize a pattern classifier to output an aircraft pattern of an aircraft depicted in traffic by, for example, the tail number. A "pattern classifier," as used herein, is a classifier configured to generate an aircraft pattern. Pattern classifier may match Historic traffic movement of an aircraft to the traffic movement 120 and output an aircraft pattern. "Historic traffic movement," as used herein, is past determinations or observations regarding the arrival, stay, and departure of an aircraft at a landing facility. Historic traffic movement may be past traffic movement 120 generated by the processor 104 or received from other resources as described above. Historic traffic movement may be retrieved from camera database. Pattern classifier training data may include Historic traffic movement correlated tail number of an aircraft and any other form of data as described throughout this disclosure. Pattern classifier may be configured to raise the output of aircraft classifier, traffic movement and tail number, and output the aircraft pattern. The aircraft pattern may be used in a machine-learning process to derive and estimate or predict the traffic movement of the aircraft as described further below.

Still referring to FIG. 1, processor 104 may be configured to generate a traffic report as a function of the location datum 116, traffic movement, aircraft pattern, the tail number, and any other data as described herein. A "traffic report," as used herein is a data structure containing data related to aircraft traffic at a landing facility. Traffic report may include current traffic statement, a traffic estimate statement and other determinations made by the processor 104. A "current traffic statement," is data reporting on the current state of aircraft traffic. A "traffic estimate statement," as used herein, is a data predicting the movement of aircraft traffic. Current traffic statement and traffic estimate statement may be represented as linguistic or numerical variables. For example, variables may include time durations, percentages of completion (e.g., aircraft arrival, stay, and departure) and verbal status (e.g., "on time, "delayed," "arriving"). Processor 104 may generate traffic report utilizing machine-learning process, neural networks, deep learning, linear regression models and the like.

Still referring to FIG. 1, in some embodiments, generating the traffic report may include utilizing a report module. A "report module," as used herein, is a plurality of processes working together to generate a traffic report. Report module may include a current traffic classifier, a prediction classifier, and a report classifier as described below. A "current traffic classifier," as used herein, is a classifier configured to generate a current traffic statement. Current traffic classifier training data may include a plurality of aircraft tail numbers correlated to traffic movement data. Current traffic classifier training data may also include a variable databank and all other data described throughout this disclosure. A "variable databank," as used herein, is a plurality of numerical and linguistic variables correlated to traffic movement, for example, "delayed" may be correlated to an aircraft parked at a charging station over an extended period of time. Current traffic classifier may be configured to receive location datum 116 and outputs of aircraft classified as inputs and outputs the current traffic statement. A "prediction classifier," as used herein, is a classifier configured to generate a traffic estimate statement. Prediction classifier training data may include location datum 116 of an aircraft correlated to an aircraft pattern. Prediction classifier training data may also include variable databank and any of form of training data as described throughout this disclosure. Prediction classifier may receive current traffic statement as an input and output the traffic estimate statement.

Still referring to FIG. 1, a "report classifier," as used herein is a classifier configured to output a traffic report. Report classifier training data may include a report template. A "report template," as used herein is an outline of data to be organized in a data structure. The report template may prompt wherein information generated by processor 104 is to be placed and with what kind. For example, each section of the report template may prompt for the tail number of an aircraft along with the associated current traffic statement and traffic estimate statement. Report classifier training data may correlate current traffic statement and traffic estimate statement to a report template. Report classifier training data may include contract information of person or facility correlated to a tail number of an aircraft. For example, report classifier may match a plurality of passengers registered to on board an aircraft at a landing facility. In some cases, a Federal Aviation Administration (FAA) tail number database may be used to associate user with an aircraft or tail number as part of report classifier training data. In some cases, a front desk personnel at a landing facility may enter manually contact information may a passenger, alternatively a passenger may enter contact information through a remote device, such as a phone as part of report classifier training data. In some embodiments, report classifier may output an individual traffic report for each aircraft at a landing facility and/or output a traffic report aggregating a plurality of traffic statements and traffic estimate statement into a landing facility traffic report. For example, a landing facility traffic report may be the overall status of traffic on a ramp, such as the number of aircrafts parked, charging, departing, arriving, stalled, boarding, off boarding, and the like. A landing facility traffic may include an overall current traffic statements and an overall traffic estimate statement accounting for all aircrafts detected a landing facility.

Still referring to FIG. 1, processor 104 may be configured to transmit traffic report or elements of traffic report as a notification to a remote device, such as a remote computing device associated with a passenger. A "passenger," as used herein, is a person. Apparatus may be used in conjunction with a software system interface and method for onboarding user onto an aircraft. Onboarding may include associating contact information with an aircraft (e.g., tail number) as described above. Communication with passenger may be performed directly when processor 104 has contact information associated with a passenger. For example, processor 104 may generate an email or text message to notify the passage with traffic report. Communication with user may be performed indirectly when the system has only snail mail contact information with user or no contact information. For example, process may transmit traffic report through a graphical user interface or airline application interface to be generally displayed. Indirect information may include communicating with personnel at an airport, such as TSA. Airport personnel may chase down user associated with an aircraft, when needed. In some cases, communication with a passenger may require an opt-in function.

Figure 2:
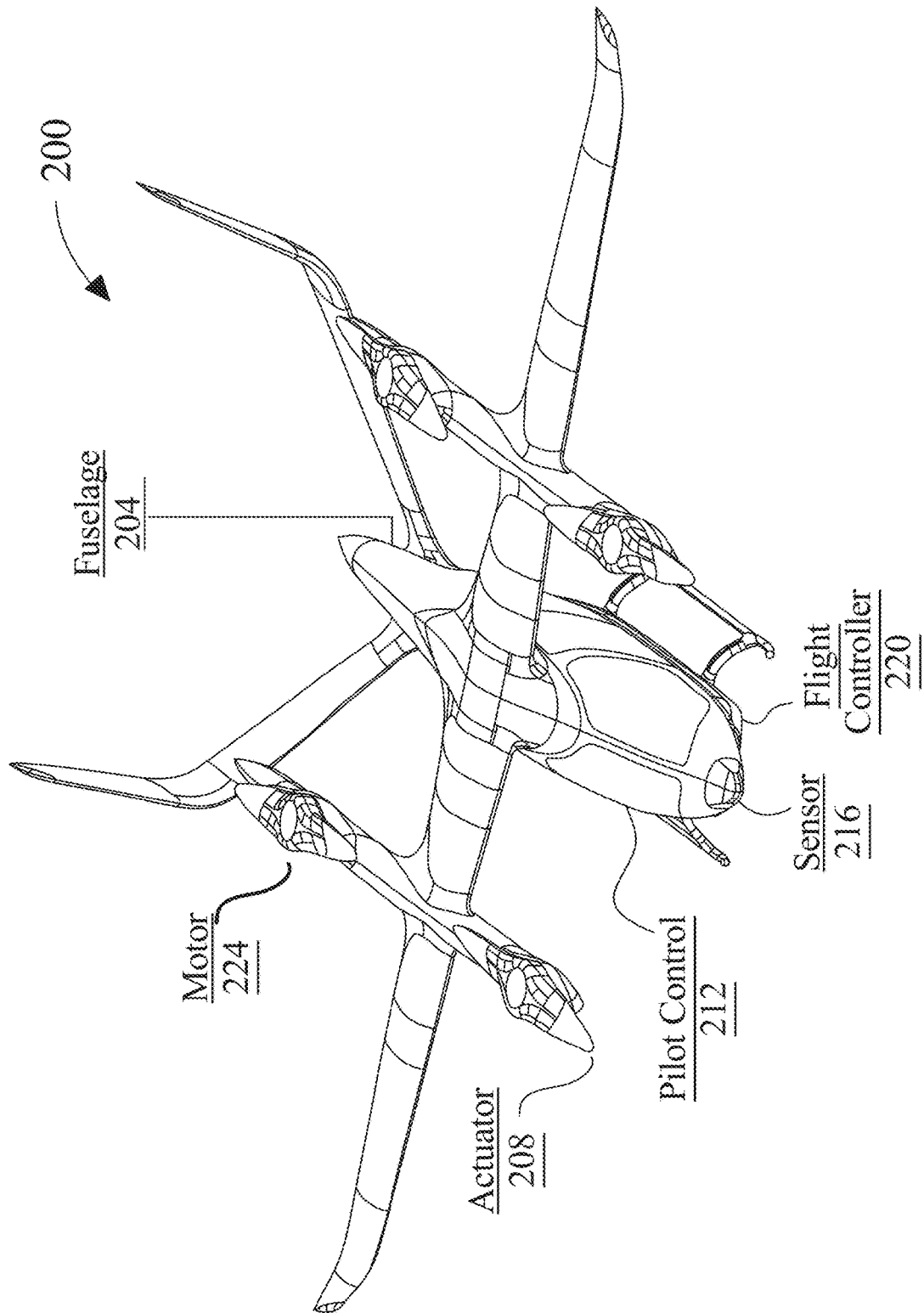
FIG. 2 is a diagram depicting an exemplary aircraft.

Referring now to FIG. 2, an exemplary embodiment of an aircraft 200 is illustrated. Aircraft 200 may include an electrically powered aircraft (i.e., electric aircraft). In some embodiments, electrically powered aircraft may be an electric vertical takeoff and landing (eVTOL) aircraft. In some embodiments, aircraft 200 may include a fuselage 204. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 2, aircraft 200 may include a plurality of actuators 208. Actuator 208 may include any motor and/or propulsor described in this disclosure. In an embodiment, actuator 208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 2, a plurality of actuators 208 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 208 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 208 may include a rudder, which may include, without limitation, a segmented rudder that produces a torque about a vertical axis. Additionally, or alternatively, plurality of actuators 208 may include other flight control surfaces such as propulsors, rotating flight controls, or any other structural features which can adjust movement of aircraft 200. Plurality of actuators 208 may include one or more rotors, turbines, ducted fans, paddle wheels, and/or other components configured to propel a vehicle through a fluid medium including, but not limited to air.

Still referring to FIG. 2, plurality of actuators 208 may include at least a propulsor component. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

Still referring to FIG. 2, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g., a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally, or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 2, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 2, plurality of actuators 208 may include power sources, control links to one or more elements, fuses, and/or mechanical couplings used to drive and/or control any other flight component. Plurality of actuators 208 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively, or additionally, a motor may be driven by an inverter. A motor may also include electronic speed controllers, inverters, or other components for regulating motor speed, rotation direction, and/or dynamic braking.

Still referring to FIG. 2, plurality of actuators 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 2, in another embodiment, an energy source may be used to provide a steady supply of electrical power to a load over a flight by an electric aircraft 200. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 2, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 2, another exemplary actuator may include landing gear. Landing gear may be used for take-off and/or landing/Landing gear may be used to contact ground while aircraft 200 is not in flight. Exemplary landing gear is disclosed in detail in U.S. patent application Ser. No. 17/196, 719 entitled "SYSTEM FOR ROLLING LANDING GEAR" by R. Griffin et al., which is incorporated in its entirety herein by reference.

Still referring to FIG. 2, aircraft 200 may include a pilot control 212, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 208. For example, and without limitation, collective control may alter and/or adjust the pitch angle of all of the main rotor blades collectively. For example, and without limitation pilot control 212 may include a yoke control. As used in this disclosure a "yoke control" is a mechanical control of an aircraft to control the pitch and/or roll. For example, and without limitation, yoke control may alter and/or adjust the roll angle of aircraft 200 as a function of controlling and/or maneuvering ailerons. In an embodiment, pilot control 212 may include one or more footbrakes, control sticks, pedals, throttle levels, and the like thereof. In another embodiment, and without limitation, pilot control 212 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 200 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 200 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 2, pilot control 212 may be configured to modify a variable pitch angle. For example, and without limitation, pilot control 212 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 212 may modify the variable pitch angle from a first angle of 2.71° to a second angle of 3.52°. Additionally or alternatively, pilot control 212 may be configured to translate a pilot desired torque for flight component 208. For example, and without limitation, pilot control 212 may translate that a pilot's desired torque for a propeller be 160 lb. ft. of torque. As a further non-limiting example, pilot control 212 may introduce a pilot's desired torque for a propulsor to be 290 lb. ft. of torque. Additional disclosure related to pilot control 212 may be found in U.S. patent application Ser. Nos. 17/001, 545 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 2, aircraft 200 may include a loading system. A loading system may include a system configured to load an aircraft of either cargo or personnel. For instance, some exemplary loading systems may include a swing nose, which is configured to swing the nose of aircraft 200 of the way thereby allowing direct access to a cargo bay located behind the nose. A notable exemplary swing nose aircraft is Boeing 747. Additional disclosure related to loading systems can be found in U.S. patent application Ser. No. 17/107,594 entitled "SYSTEM AND METHOD FOR LOADING AND SECURING PAYLOAD IN AN AIRCRAFT" by R. Griffin et al., entirety of which in incorporated herein by reference.

Still referring to FIG. 2, aircraft 200 may include a sensor 216. Sensor 216 may include any sensor or noise monitoring circuit described in this disclosure. 216 may be configured to sense a characteristic of pilot control 212. Sensor may be a device, module, and/or subsystem, utilizing any hardware, software, and/or any combination thereof to sense a characteristic and/or changes thereof, in an instant environment, for instance without limitation a pilot control 212, which the sensor is proximal to or otherwise in a sensed communication with, and transmit information associated with the characteristic, for instance without limitation digitized data. Sensor 216 may be mechanically and/or communicatively coupled to aircraft 200, including, for instance, to at least a pilot control 212. Sensor 216 may be configured to sense a characteristic associated with at least a pilot control 212. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 216 may include at least a geospatial sensor. Sensor 216 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 200 for both critical and non-critical functions. Sensor may be incorporated into vehicle or aircraft or be remote.

Still referring to FIG. 2, in some embodiments, sensor 216 may be configured to sense a characteristic associated with any pilot control described in this disclosure. Non-limiting examples of a sensor 216 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 216 may sense a characteristic as an analog measurement, for instance, yielding a continuously variable electrical potential indicative of the sensed characteristic. In these cases, sensor 216 may additionally comprise an analog to digital converter (ADC) as well as any additional circuitry, such as without limitation a Whetstone bridge, an amplifier, a filter, and the like. For instance, in some cases, sensor 216 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively, or additionally, sensor 216 may sense a characteristic of a pilot control 212 digitally. For instance, in some embodiments, sensor 216 may sense a characteristic through a digital means or digitize a sensed signal natively. In some cases, for example, sensor 216 may include a rotational encoder and be configured to sense a rotational position of a pilot control; in this case, the rotational encoder digitally may sense rotational "clicks" by any known method, such as without limitation magnetically, optically, and the like.

Still referring to FIG. 2, electric aircraft 200 may include at least a motor 224, which may be mounted on a structural feature of the aircraft. Design of motor 224 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 224 may include two main holes in top and bottom of mounting area to access bearing cartridge. Further, a structural feature may include a component of electric aircraft 200. For example, and without limitation structural feature may be any portion of a vehicle incorporating motor 224, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 208. Persons skilled in the art, upon reviewing the entirety of this disclosure, will be aware of various materials, combinations of materials, and/or constructions techniques.

Still referring to FIG. 2, a number of aerodynamic forces may act upon the electric aircraft 200 during flight. Forces acting on electric aircraft 200 during flight may include, without limitation, thrust, the forward force produced by the rotating element of the electric aircraft 200 and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the propulsor 208 of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor 224 may eliminate need for many external structural features that otherwise might be needed to join one component to another component. Motor 224 may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

Figure 3:
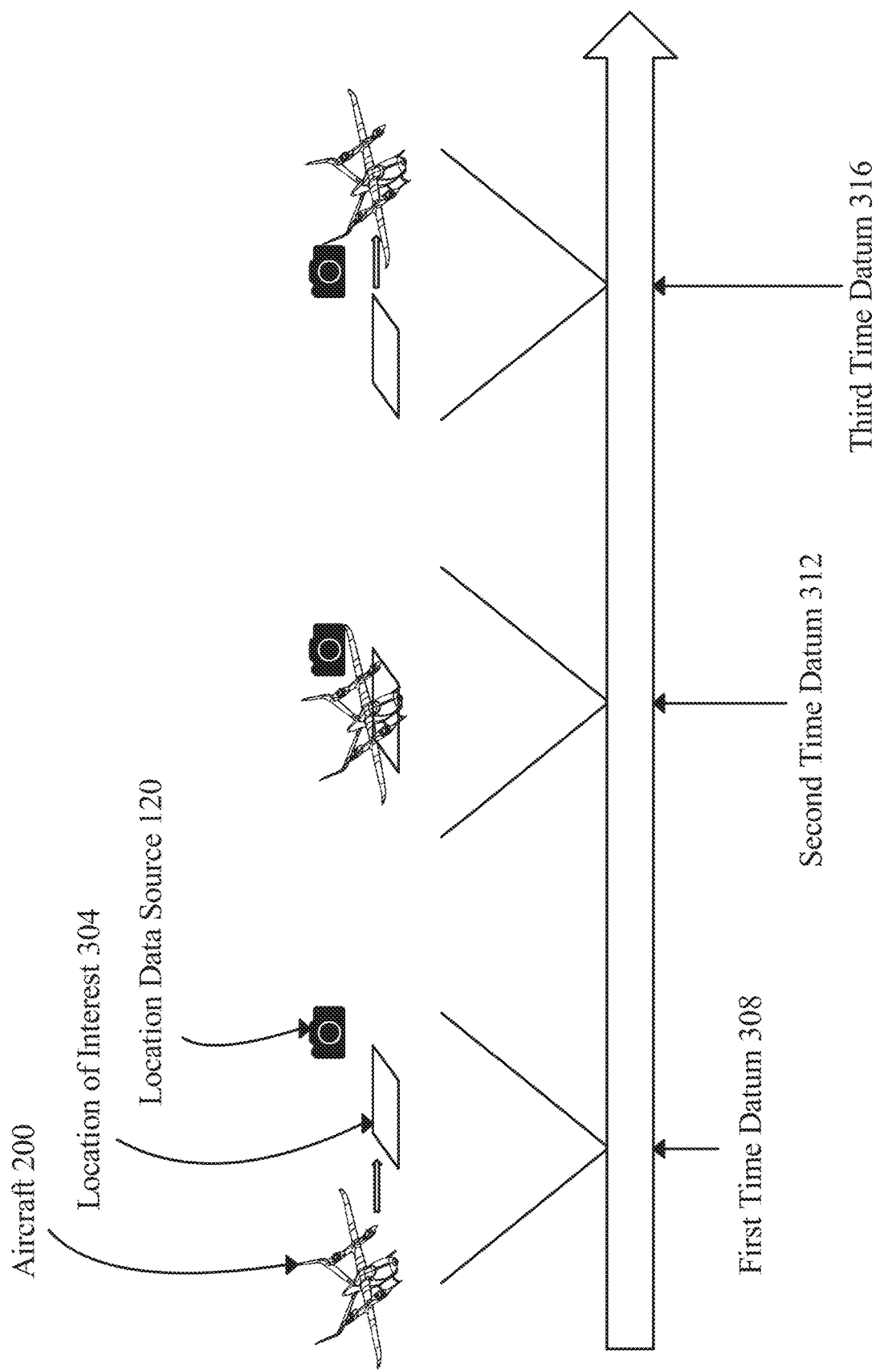
FIG. 3 is a diagram depicting an exemplary apparatus functioning over time.

Now referring to FIG. 3, location datum 116 may be associated with an aircraft 200 arrival and/or departure from a location of interest 304. A location data source 120 may capture location datum 116 at multiple points in time and may determine whether an aircraft is in a location of interest at that time. In an embodiment, a location data source captures a first time datum 308 associated with a first location datum 116 indicating that an aircraft is not in the location of interest. In an embodiment, a location data source captures a second time datum 312 associated with a second location datum 116 indicating that an aircraft has arrived in the location of interest. In an embodiment, a location data source captures a third time datum 316 associated with a third location datum 116 indicating that an aircraft has departed the location of interest. Such time-stamped location data may be used to determine how long the aircraft spent in the location of interest, for example, by finding the difference between the arrival and departure times.

Still referring to FIG. 3, in some embodiments, location datum 116 may be transmitted alongside additional data such as data identifying an aircraft or data describing the aircraft. In some embodiments, location datum 116 may include an image received from a machine vison camera.

Figure 4:
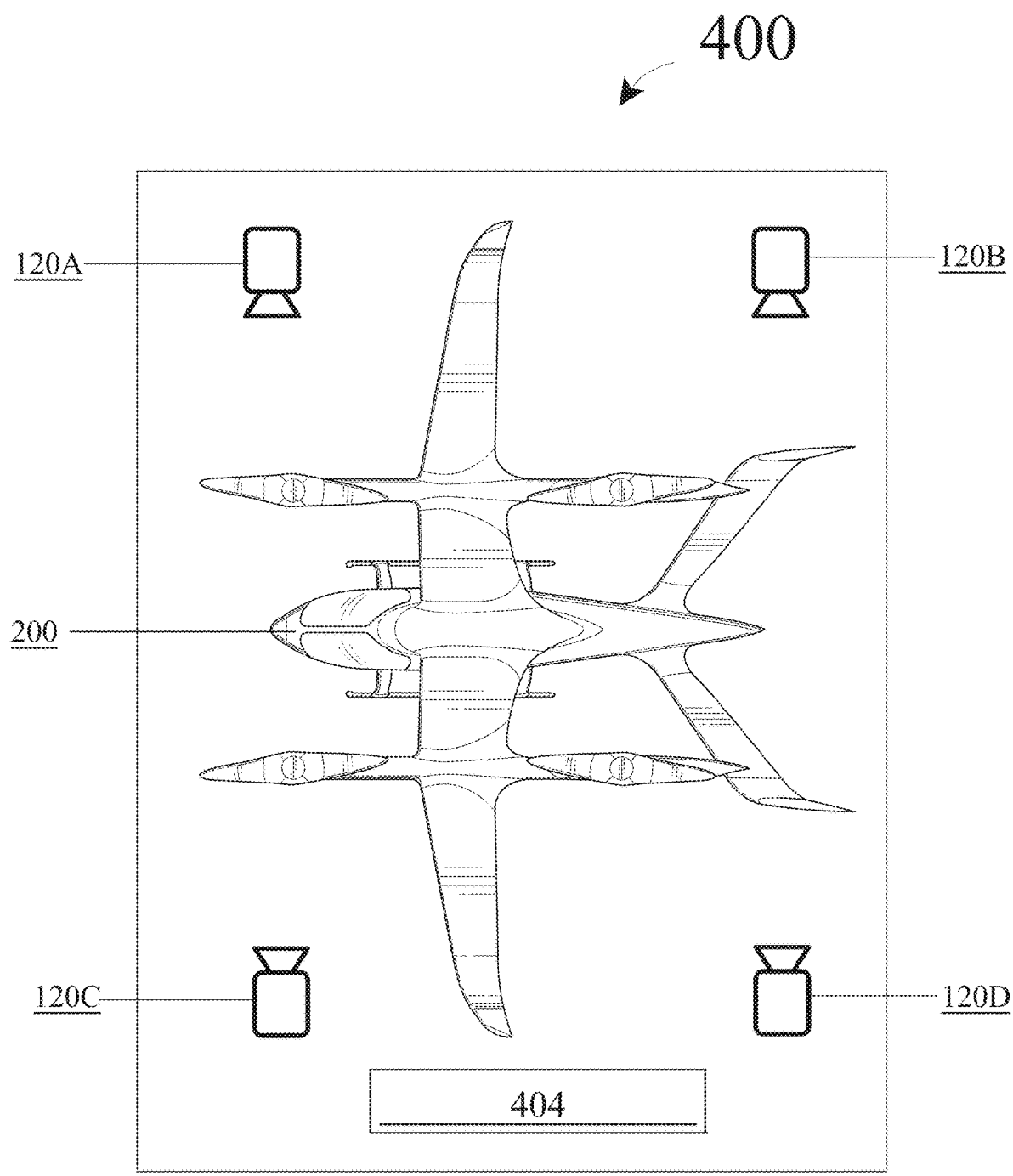
FIG. 4 is a diagram depicting an exemplary apparatus including multiple location data sources.

Referring now to FIG. 4, is an exemplary diagram 400 of apparatus 100 operating at a landing facility. Landing facility may include a ramp wherein aircraft 200 may be located at location of interest 404 of the ramp. A plurality of location data sources 120A-D may be located at location of interest 404. One or more of location data sources 120A-D may include a machine vision camera and may provide a plurality of different angles of aircraft 200. Location data sources and/or machine vision cameras may be disclosed further in U.S. Non-provisional patent application Ser. No. 18/203, 995, filed on May 31, 2023, and entitled "APPARATUS AND METHOD FOR TRACKING AIRCRAFT RAMP TRAFFIC," the entirety of which is incorporated herein by reference.

Figure 5:
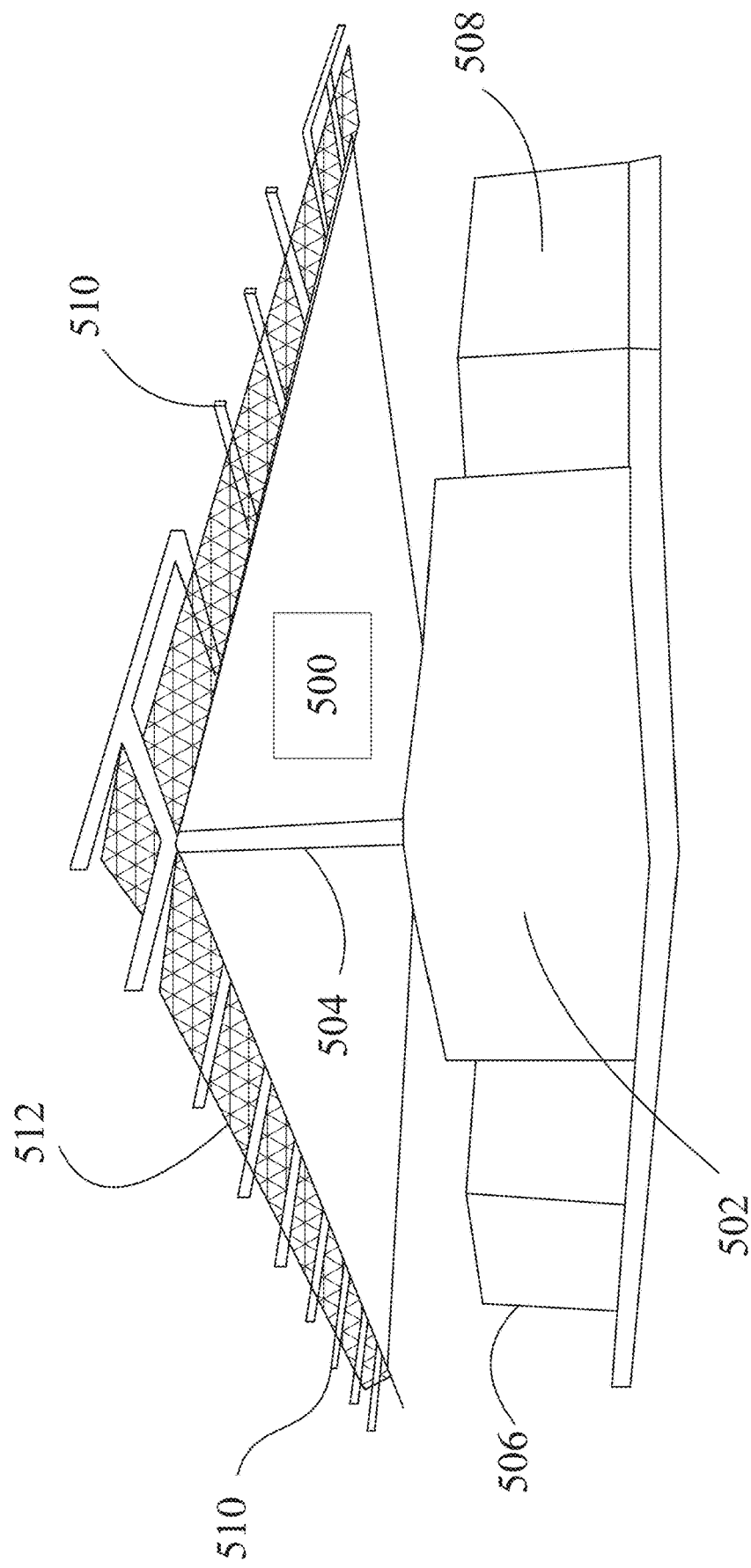
FIG. 5 is a diagram depicting an exemplary recharging station for recharging an electric aircraft.

Referring now to FIG. 5, an exemplary embodiment of a recharging station 500 for recharging an electric aircraft is illustrated. In some embodiments a recharging station 500 may be constructed from any of variety of suitable materials or any combination thereof. In some embodiments, recharging station 500 may be constructed from metal, concrete, polymers, or other durable materials. In one embodiment, recharging station 500 may be constructed from a lightweight metal alloy. In some embodiments, recharging station 500 may include a helideck or helipad.

In some embodiments, and with further reference to FIG. 5, recharging station 500 may be elevated above sea level. In one embodiment, recharging station 500 may be elevated at least 20 feet above sea level. In some embodiments, recharging station 500 may be elevated more than 20 feet above sea level. In one embodiment, recharging station 500 may have dimensions suitable for supporting various aircraft. In one embodiment, recharging station 500 may be at least 50 feet in area. In other embodiments recharging station 500 may have an area of greater or less than 50 feet. In another embodiment, two or more recharging stations 500 may combine together for greater surface area to support more aircraft. In some embodiments, and still referring to FIG. 5, recharging station 500 may have a support component 502 coupled to recharging station 500. In one embodiment, support component 502 may include a support column 504. Support column 504 may be made from a variety of suitable materials, which may include without limitation any materials described above as suitable for the recharging station 500, to support one or more aircraft on a recharging station 500. In some embodiments the support column 504 may be made from a lightweight metal alloy. In some embodiments, a support component 502 may be coupled to the recharging station 500. The support component 502 may be beneath the recharging station 500 to provide structural support and elevation.

In some embodiments, and continuing to refer to FIG. 5, the support component 502 may have a plurality of support columns 704. The recharging pad 500 may also include supporting structures 570. Supporting structures 570 may provide additional structural support to the recharging station 500. Supporting structures 500 may have a net meshing 572. Net meshing 572 may include a variety of suitable materials. In one embodiment, net meshing 572 may include, without limitation, polyester, nylon, polypropylene, polyethylene, PVC and PTFE. Net meshing 572 may provide additional support to recharging station 500. Net meshing 572 may also act as a safety measure to prevent persons or cargo from falling off recharging station 500.

In some embodiments, and with further reference to FIG. 5, support component 502 may comprise a plurality of modular housings 506. Modular housings 506 may be configured based on the needs of a mission or location. For example, modular housings 506 may contain a hotel container for the pilot and flight crew to rest in. In one embodiment, a hotel container may include a bed, bathroom, shower, and integrated water heaters. In another embodiment, the modular housings 506 may have a control room for pilots and flight crew to relax, eat, study, and plan their next mission.

In another embodiment, and still referring to FIG. 5, a unit of a modular housings 506 may include an electrical power supply 508. Electrical power supply may include an electrical storage unit such as a battery storage unit. The battery storage unit may contain batteries, a solar inverter, a power grid component, and power distribution panels. Any component of electrical power supply, including electrical storage may include, be included in, share components with, and/or be implemented according to any other electrical power supplies, storage units, or the like as described in this disclosure. In one embodiment, the plurality of modular housings of a support component 502 may enable quick construction and deconstruction of a recharging station 500. In one embodiment, a support component 502 may be constructed on top of one or more buildings. In another embodiment, a support component 502 may be constructed in a remote location. In one embodiment, one of the modular housings of support component 502 may have a hotel container. The hotel container may include a bed, a bathroom, a shower, and a sink. In some embodiments, the hotel container may also serve as a storage unit for freshwater, gray water, and blackwater. In other embodiments, the hotel container may serve as a storage unit for a plumbing system. In some embodiments, a plumbing system may be integrated throughout support component 502. In one embodiment, a plumbing system may include integrated water heaters. In some embodiments, the support component 502 may have a hydraulic lift system. In one embodiment, the hydraulic lift system may be configured to ascend or descend one or more persons and cargo to the recharging station 500. In some embodiments, support component 502 may be configured to connect to a surrounding plumbing system. In some embodiments, support component 502 may be configured to connect to a surrounding sewage system. In other embodiments, support component 502 may be configured to connect to a septic tank system.

In some embodiments, and continuing to refer to FIG. 5, recharging station 500 may include a power supply unit. The power supply unit may have electrical components that may be configured to receive electrical power, which may include alternating current ("AC") and/or direct current ("DC") power, and output DC and/or AC power in a useable voltage, current, and/or frequency. In one embodiment, the power supply unit may include a power storage unit 508. The power storage unit 508 may be configured to store 500 kwh of electrical energy. In another embodiment, power storage unit 508 may be configured to store more than 500 kwh of electrical energy. Power storage unit 508 may house a variety of electrical components. In one embodiment, power storage unit 508 may contain a solar inverter. The solar inverter may be configured to produce on-site power generation. In one embodiment, the power generated from the solar inverter may be stored in power storage unit 508. In some embodiments, power storage unit 508 may include a used electric aircraft battery pack no longer fit for flight. Recharging station 500 may include embodiments as disclosed in U.S. patent application Ser. No. 18/096,432 filed Jan. 12, 2023, entitled "RECHARGING STATION FOR ELECTRIC AIRCRAFTS AND METHOD OF ITS USE," U.S. patent application Ser. No. 17/320,329 filed May 14, 2021, entitled "SYSTEMS AND METHODS FOR MONITORING HEALTH OF AN ELECTRIC VERTICAL TAKE-OFF AND LANDING VEHICLE," and U.S. patent application Ser. No. 17/515,419 filed Oct. 30, 2021, entitled "SYSTEMS AND METHODS FOR MONITORING HEALTH OF AN ELECTRIC VERTICAL TAKE-OFF AND LANDING VEHICLE," each of which is incorporated herein by reference in its entirety.

Figure 6:
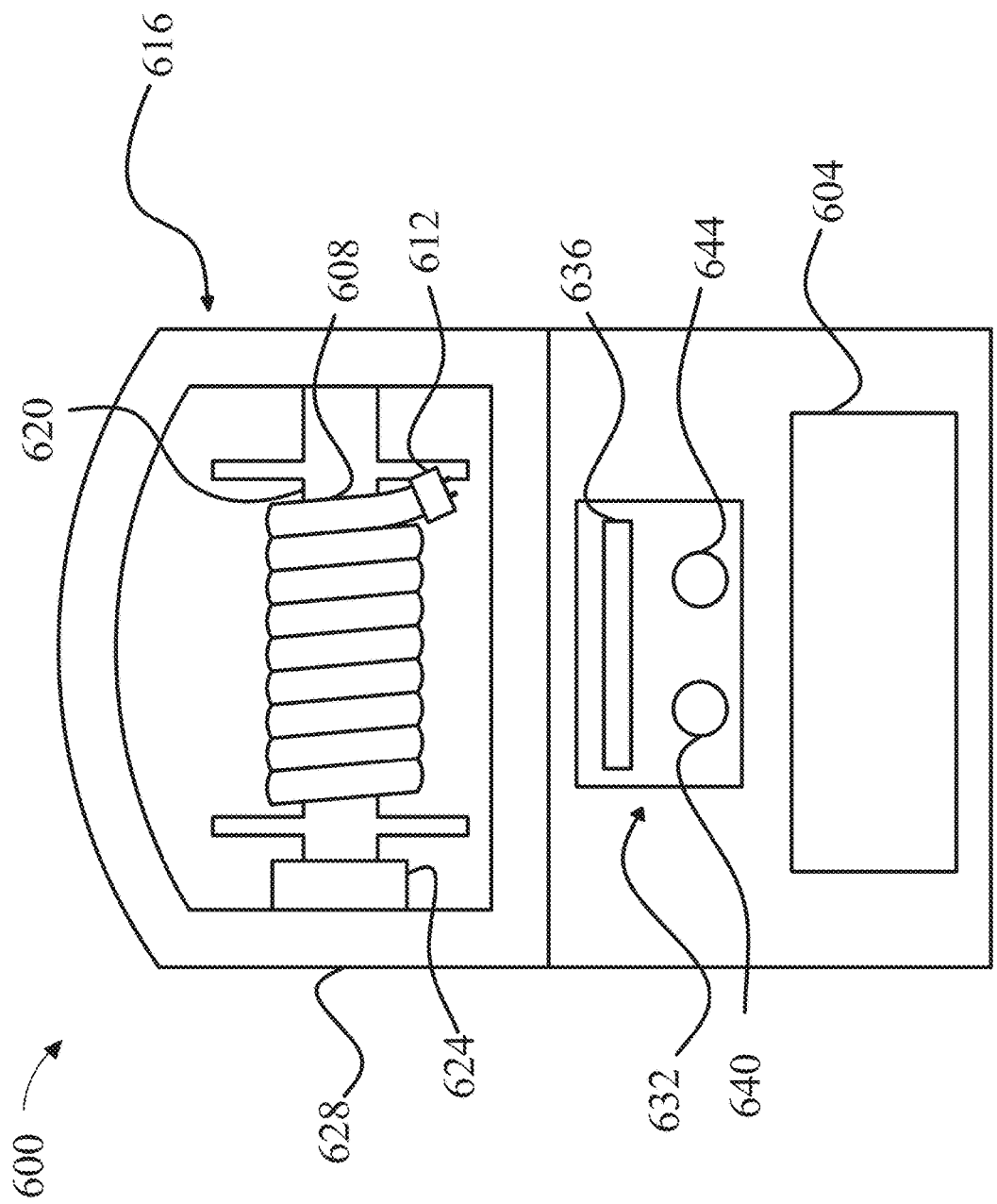
FIG. 6 is a diagram depicting an exemplary electric aircraft charging system.

Referring now to FIG. 6, an embodiment of an electric aircraft charging system 600 is shown. System 600 includes an energy source 604. An "energy source," for the purposes of this disclosure, is a source of electrical power. In some embodiments, energy source 604 may be an energy storage device, such as, for example, a battery or a plurality of batteries. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, energy source 604 need not be made up of only a single electrochemical cell, it can consist of several electrochemical cells wired in series or in parallel. In other embodiments, energy source 604 may be a connection to the power grid. For example, in some non-limiting embodiments, energy source 604 may include a connection to a grid power component. Grid power component may be connected to an external electrical power grid. In some other embodiments, the external power grid may be used to charge batteries, for example, when energy source 604 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 600 may be consistent with the charger disclosed in U.S. application Ser. No. 17/477,987 filed on Sep. 17, 2021, titled "Systems and Methods for Adaptive Electric aircraft," the entirety of which is hereby incorporated by reference. Additionally, some components of system 100 may be consistent with the charger disclosed in U.S. application Ser. No. 17/515,448 filed on Oct. 31, 2021, titled "Systems and Methods for an Immediate Shutdown of an Electric aircraft Charger," the entirety of which is hereby incorporated by reference.

With continued reference to FIG. 6, system 600 may include a charging cable 608. A "charging cable," for the purposes of this disclosure is a conductor or conductors adapted to carry power for the purpose of charging an electronic device. Charging cable 608 is configured to carry electricity. Charging cable 608 is electrically connected to the energy source 604. "Electrically connected," for the purposes of this disclosure, means a connection such that electricity can be transferred over the connection. In some embodiments, charging cable 608 may carry AC and/or DC power to a charging connector 612. The charging cable may include a coating, wherein the coating surrounds the conductor or conductors of charging cable 608. One of ordinary skill in the art, after having reviewed the entirety of this disclosure, would appreciate that a variety of coatings are suitable for use in charging cable 608. As a non-limiting example, the coating of charging cable 608 may comprise rubber. As another non-limiting example, the coating of charging cable 608 may comprise nylon. Charging cable 608 may be a variety of lengths depending on the length required by the specific implementation. As a non-limiting example, charging cable 608 may be 10 feet. As another non-limiting example, charging cable 608 may be 25 feet. As yet another non-limiting example, charging cable 608 may be 50 feet.

With continued reference to FIG. 6, system 600 may include a charging connector 612. Charging cable 608 may be electrically connected to charging connector 612. Charging connector 612 may be disposed at one end of charging cable 608. Charging connector 612 may be configured to couple with a corresponding charging port on an electric aircraft. For the purposes of this disclosure, a "charging connector" is a device adapted to electrically connect a device to be charged with an energy source. For the purposes of this disclosure, a "charging port" is a section on a device to be charged, arranged to receive a charging connector.

With continued reference to FIG. 6, charging connector 612 may include a variety of pins adapted to mate with a charging port disposed on an electric aircraft. An "electric aircraft," for the purposes of this disclosure, refers to a machine that is able to fly by gaining support from the air generates substantially all of its trust from electricity. As a non-limiting example, electric aircraft maybe capable of vertical takeoff and landing (VTOL) or conventional takeoff and landing (CTOL). As another non-limiting example, the electric aircraft may be capable of both VTOL and CTOL. As a non-limiting example, electric aircraft may be capable of edgewise flight. As a non-limiting example, electric aircraft may be able to hover. Electric aircraft may include a variety of electric propulsion devices; including, as non-limiting examples, pushers, pullers, lift devices, and the like. The variety of pins included on charging connector 612 may include, as non-limiting examples, a set of pins chosen from an alternating current (AC) pin, a direct current (DC) pin, a ground pin, a communication pin, a sensor pin, a proximity pin, and the like. In some embodiments, charging connector 612 may include more than one of one of the types of pins mentioned above.

With continued reference to FIG. 6, for the purposes of this disclosure, a "pin" may be any type of electrical connector. An electrical connector is a device used to join electrical conductors to create a circuit. As a non-limiting example, in some embodiments, any pin of charging connector 612 may be the male component of a pin and socket connector. In other embodiments, any pin of charging connector 612 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 612 may include a locking mechanism. For instance, as a non-limiting example, any pin of charging connector 612 may include a locking mechanism to lock the pins in place. The pin or pins of charging connector 612 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

With continued reference to FIG. 6, in some embodiments, charging connector 612 may include a DC pin. DC pin supplies DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying currant constant voltage, or constant currant varying voltage. In another embodiment, when charging connector is charging certain types of batteries, DC pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like.

With continued reference to FIG. 6, in some embodiments, charging connector may include an AC pin. An AC pin supplies AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 6, in some embodiments, charging connector 612 may include a ground pin. A ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 6, in some embodiments, charging connector 612 may include a communication pin. A communication pin is an electric connector configured to carry electric signals between components of charging system 600 and components of an electric aircraft. As a non-limiting example, communication pin may carry signals from a controller in a charging system to a controller onboard an electric aircraft such as a flight controller or battery management controller. A person of ordinary skill in the art would recognize, after having reviewed the entirety of this disclosure, that communication pin could be used to carry a variety of signals between components.

With continued reference to FIG. 6, charging connector 612 may include a variety of additional pins. As a non-limiting example, charging connector 612 may include a proximity detection pin. Proximity detection pin has no current flowing through it when charging connector 612 is not connected to a port. Once charging connector 612 is connected to a port, then proximity detection pin will have current flowing through it, allowing for the controller to detect, using this current flow, that the charging connector 612 is connected to a port.

With continued reference to FIG. 6, system 600 may include a cable reel module 616. The cable reel module 616 may include a reel 620. For the purposes of this disclosure, a "cable reel module" is the portion of a charging system containing a reel, that houses a charging cable when the charging cable is stowed. For the purposes of this disclosure, a "reel" is a rotary device around which an object may be wrapped. Reel 620 is rotatably mounted to cable reel module 616. For the purposes of this disclosure, "rotatably mounted" means mounted such that the mounted object may rotate with respect to the object that the mounted object is mounted on. Additionally, when the charging cable 608 is in a stowed configuration, the charging cable is wound around reel 620. As a non-limiting example, charging cable 608 is in the stowed configuration in FIG. 6. In the stowed configuration, charging cable 608 need not be completely wound around reel 620. As a non-limiting example, a portion of charging cable 608 may hang free from reel 620 even when charging cable 608 is in the stowed configuration.

With continued reference to FIG. 6, cable reel module 616 includes a rotation mechanism 624. A "rotation mechanism," for the purposes of this disclosure is a mechanism that is configured to cause another object to undergo rotary motion. As a non-limiting example, rotation mechanism may include a rotary actuator. As a non-limiting example, rotation mechanism 624 may include an electric motor. As another non-limiting example, rotation mechanism 624 may include a servomotor. As yet another non-limiting example, rotation mechanism 624 may include a stepper motor. In some embodiments, rotation mechanism 624 may include a compliant element. For the purposes of this disclosure, a "compliant element" is an element that creates force through elastic deformation. As a non-limiting example, rotation mechanism 624 may include a torsional spring, wherein the torsional spring may elastically deform when reel 620 is rotated in, for example, the forward direction; this would cause the torsional spring to exert torque on reel 620, causing reel 620 to rotate in a reverse direction when it has been released. Rotation mechanism 624 is configured to rotate reel 620 in a reverse direction. In some embodiments, rotation mechanism 624 may be configured to rotate reel 620 in a forward direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 608 to extend, whereas rotating in the reverse direction may cause charging cable 608 to stow, or vice versa. In some embodiments, rotation mechanism 624 may continually rotate reel 620 when rotation mechanism 624 is enabled. In some embodiments, rotation mechanism 624 may be configured to rotate reel 620 by a specific number of degrees. In some embodiments, rotation mechanism 624 may be configured to output a specific torque to reel 620. As a non-limiting example, this may be the case, wherein rotation mechanism 624 is a torque motor. Rotation mechanism 624 may be electrically connected to energy source 604.

With continued reference to FIG. 6, cable reel module 616 may include an outer case 628. Outer case 628 may enclose reel 620 and rotation mechanism 624. In some embodiments, outer case 628 may enclose charging cable 608 and possibly charging connector 612 when the charging cable 608 is in its stowed configuration.

With continued reference to FIG. 6, system 600 may include a control panel 632. For the purposes of this disclosure, a "control panel" is a panel containing a set of controls for a device. Control panel 632 may include a display 636, a reel toggle 640, and a reel locking toggle 644. A display may include an electronic device for the visual presentation of information. Display 636 may include any type of screen. As non-limiting examples, display 636 may be an LED screen, an LCD screen, an OLED screen, a CRT screen, a DLPT screen, a plasma screen, a cold cathode display, a heated cathode display, a nixie tube display, and the like. Display 636 may be configured to display any relevant information. A person of ordinary skill in the art would appreciate, after having reviewed the entirety of this disclosure, that a variety of information could be displayed on display 636. In some embodiments, display 636 may display metrics associated with the charging of an electric aircraft. As a non-limiting example, this may include energy transferred. As another non-limiting example, this may include charge time remaining. As another non-limiting example, this may include charge time elapsed.

With continued reference to FIG. 6, reel toggle 640 may be configured to send a first toggle signal to a controller, wherein the first toggle signal may cause the controller to send a retraction signal. A "toggle" for the purposes of this disclosure, is a device or signal, configured to change a mechanism or device between at least two states. A "reel toggle," for the purposes of this disclosure, is a toggle that changes or alters, directly or indirectly, the rotation of a reel. In some embodiments, reel toggle 640 may be a button, wherein pressing the button causes reel toggle 640 to send the first toggle signal. In some embodiments, reel toggle 640 may be configured to send a second toggle signal to the controller, wherein the second signal causes the controller to send an extension signal. Second toggle signal and extension signal are discussed further with reference to FIG. 6. In some embodiments, reel toggle may be disposed on outer case 628 of cable reel module 616. In some embodiments, reel toggle may be disposed on charging connector 612.

With continued reference to FIG. 6, reel locking toggle 644 may be configured to send a reel locking toggle signal to a controller, wherein receiving the reel locking toggle signal may cause the controller to send an unlocking signal to a locking mechanism. A "reel locking toggle," for the purposes of this disclosure, is a toggle that changes or alters, directly or indirectly, the state of a locking mechanism. A "reel locking toggle signal," for the purposes of this disclosure, is a signal send by a reel locking toggle, wherein the reel locking toggle signal causes, directly or indirectly, a change or altercation of a locking mechanism. Receiving the unlocking signal may cause the locking mechanism to enter its disengaged state. Reel locking toggle 644, reel locking toggle signal, controller, and unlocking signal are discussed further with reference to FIG. 6. In some embodiments, reel locking toggle may be disposed on outer case 628 of cable reel module 616. In some embodiments, reel locking toggle may be disposed on charging connector 612.

With continued reference to FIG. 6, a variety of devices may be used for reel toggle 640 and/or reel locking toggle 644. In some embodiments, reel toggle 640 and/or reel locking toggle 644 may each include a button. As non-limiting examples, the button may be a mechanical button, a resistive button, a capacitive button, and the like. As a another nonlimiting example, the button may be a virtual button on a touchscreen. In some embodiments, reel toggle 640 and/or reel locking toggle 644 may each include a dial. The dial may include any number of positions, or it may be a continuous dial. In some embodiments, the dial may have 2 positions, wherein one position may be disengaged, and the second position may be engaged, and thus cause a toggle signal to be sent to the controller. In some embodiments, the dial may include an additional third position, wherein the second position causes the first toggle signal to be sent and the second position causes the second toggle signal to be sent. In some embodiments, reel toggle 640 and/or reel locking toggle 644 may each include a rocker switch. In some embodiments, the rocker switch may have 2 positions, wherein one position may be disengaged, and the second position may be engaged, and thus cause a toggle signal to be sent to the controller. In some embodiments, the rocker switch may include an additional third position, wherein the second position causes the first toggle signal to be sent and the second position causes the second toggle signal to be sent. One of ordinary skill in the art would appreciate, after having reviewed the entirety of this disclosure, that a variety of possible devices may be suitable for use as reel toggle 640 and/or reel locking toggle 644.

Still referring to FIG. 6, in some embodiments, an electric aircraft charging system may include embodiments as disclosed in U.S. patent application Ser. No. 17/736,530 filed May 4, 2022, entitled "SYSTEM FOR AN ELECTRIC AIRCRAFT CHARGING WITH A CABLE REEL," which is incorporated herein by reference in its entirety.

Figure 7:
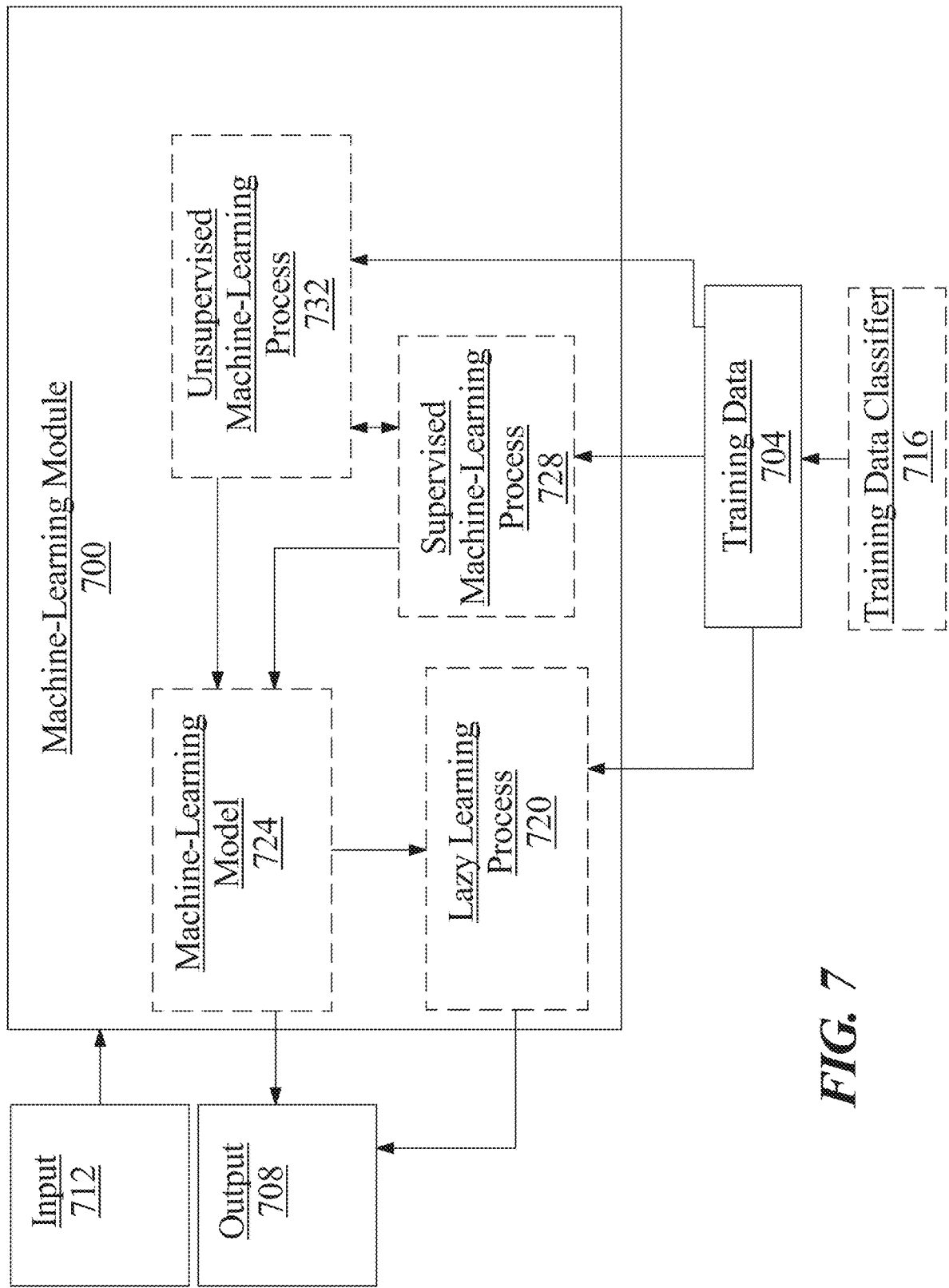
FIG. 7 is a diagram depicting an exemplary machine learning model.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, input data may include an image and an output may include a location of an aircraft in that image.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to whether there is an anomaly in location data.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include location datum 116 as described above as inputs, whether an anomaly is present as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 8:
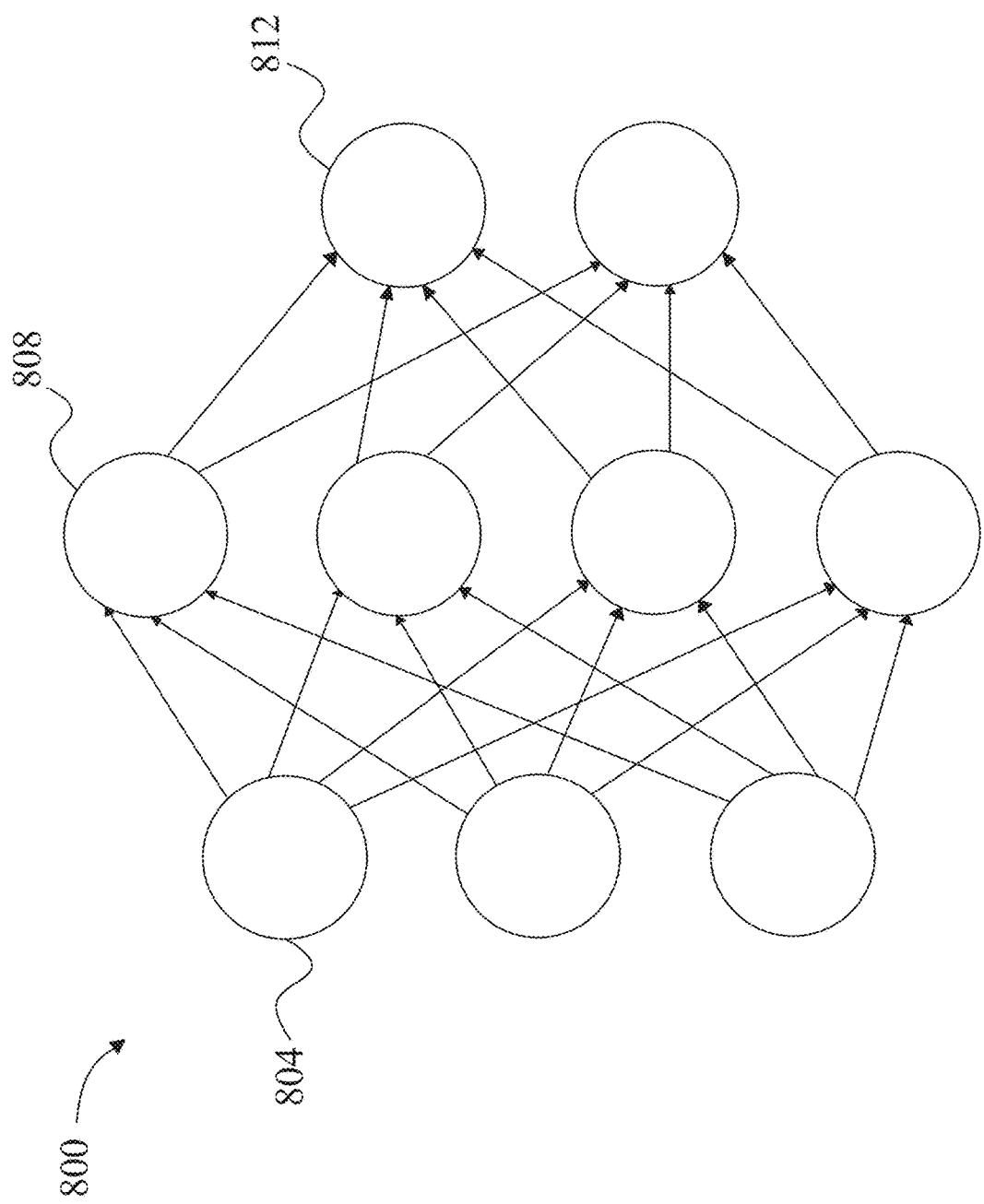
FIG. 8 is a diagram depicting an exemplary neural network.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
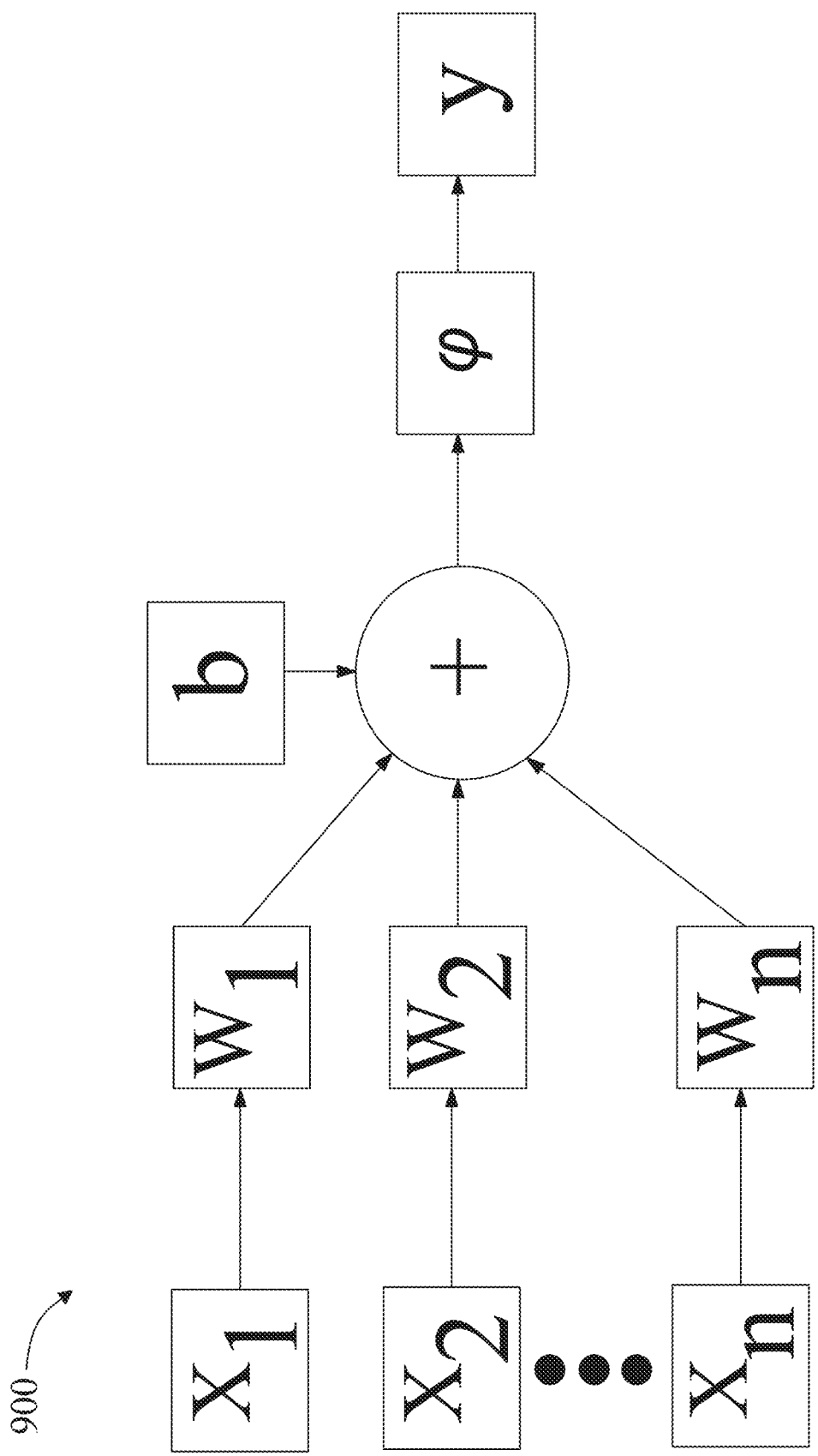
FIG. 9 is a diagram depicting an exemplary neural network node.

Referring now to FIG. 9, an exemplary embodiment of a node 900 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x \ast \text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$, that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 10:
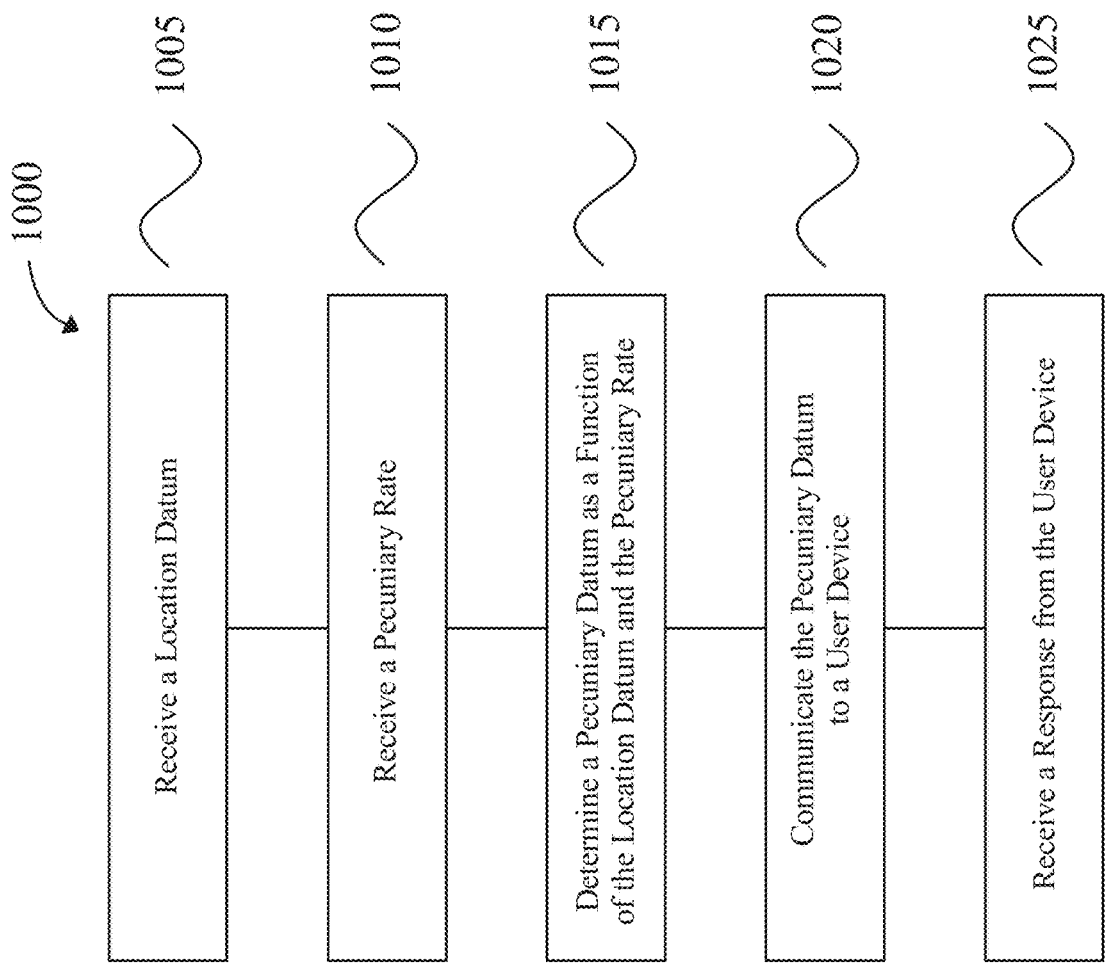
FIG. 10 is a diagram depicting an exemplary method for aircraft tracking.

Now referring to FIG. 10, also disclosed herein is a method of tracking an electric aircraft 1000. In some embodiments, a method includes using at least a processor 104, receiving a location datum 1005. In some embodiments, location datum 116 includes a machine vision datum. In some embodiments, location datum 116 includes an automatic broadcast datum. In some embodiments, location datum 116 includes a Wi-Fi datum. In some embodiments, location datum 116 includes a radio datum. In some embodiments, location datum 116 includes a public database datum. In some embodiments, location datum 116 includes an NFC datum. In some embodiments, location datum 116 includes a charging system datum. In some embodiments a location datum 116 indicates a position of an aircraft on a ramp. In some embodiments, location datum 116 is associated with a time datum. In some embodiments, receiving location datum 116 includes receiving first location datum 116 from the electric aircraft and receiving a second location datum 116 from a sensor separate from the electric aircraft. In some embodiments, a method further includes recording a time datum upon the electric aircraft reaching a location of interest. In some embodiments, a method further includes recording a time datum upon the electric aircraft departing the location of interest. In some embodiments, location of interest is an electric aircraft charging station. In some embodiments, a method includes receiving a pecuniary rate 1010. In some embodiments, a method includes determining pecuniary datum 132 as a function of location datum 116 and pecuniary rate 1015. In some embodiments, a method includes communicating pecuniary datum 132 to user device 1020. In some embodiments, a method may include receiving response from user device 1025. These steps discussed with reference to method 1000 may be implemented in as disclosed with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
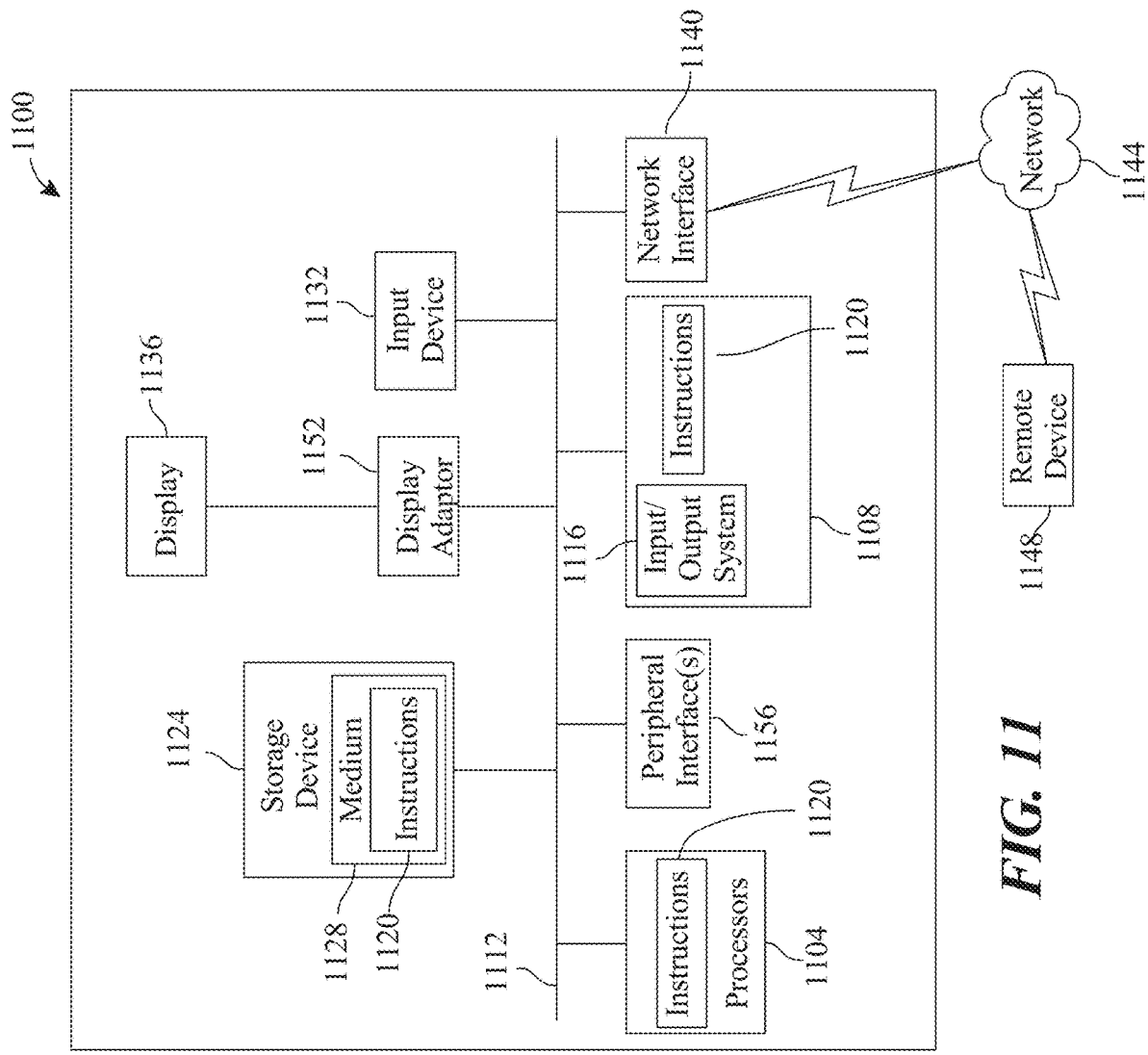
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus, comprising:
   at least a processor; and
   a memory communicatively connected to the processor, the memory containing instructions configuring the at least processor to:
   receive a first time of arrival of an aircraft on a ramp;
   receive a first time of departure of the aircraft from the ramp;
   receive a location of arrival of the aircraft on the ramp;
   receive a location of departure of the aircraft from the ramp;
   determine a non-charging pecuniary rate associated with the ramp based at least in part on at least one of the location of arrival or the location of departure;
   receive a charging pecuniary rate associated with an electric aircraft charging system;
   receive a second time of arrival of the aircraft at a location of the electric aircraft charging system;
   receive a second time of departure of the aircraft from the location of the electric aircraft charging system;

determine an amount of time of use of the electric aircraft charging system based at least in part on the second time of arrival and the second time of departure;

determine a fee based at least in part on the first time of arrival, the first time of departure, the non-charging pecuniary rate, the charging pecuniary rate, and the amount of time of use of the electric aircraft charging system; and communicate the fee to a user device.

2. The apparatus of claim 1, wherein the instructions further configure the processor to determine the fee further based at least in part on a position of the aircraft on the ramp.

3. The apparatus of claim 1, wherein at least one of the location of arrival or the location of departure comprises an automatic broadcast datum broadcast by the aircraft.

4. The apparatus of claim 1, wherein at least one of the location of arrival or the location of departure comprises a Wi-Fi datum broadcast by the aircraft.

5. The apparatus of claim 1, wherein the non-charging pecuniary rate is a flat rate and the charging pecuniary rate is based at least in part on at least one of the amount of time of use of the electric aircraft charging system or an amount of electricity received from the electric aircraft charging system.

6. The apparatus of claim 5, wherein the charging pecuniary rate is further based at least in part on an electric aircraft charging system access fee.

7. The apparatus of claim 1, wherein the non-charging pecuniary rate is based at least in part on one or more of a time of day or a demand for use of the ramp.

8. The apparatus of claim 1, wherein receiving the location of arrival comprises receiving a first location datum from the aircraft and receiving a second location datum from a sensor separate from the aircraft.

9. The apparatus of claim 1, wherein the instructions further configure the processor to:

record a third time of arrival of the aircraft at a location of interest; and record a time third of departure of the aircraft from the location of interest.

10. The apparatus of claim 9, wherein the instructions further configure the processor to determine the fee further based at least in part on the third time of arrival and the third time of departure.

11. A method, comprising:

receiving, using a processor, first sensor data from a first sensor;

determining, using the processor and based at least in part on the first sensor data, a first position of an aircraft on a ramp during a first time period;

receiving, using the processor, second sensor data from a second sensor;

determining, using the processor and based at least in part on the second sensor data, a second position of the aircraft on the ramp during a second time period;

using the processor, receiving a first pecuniary rate associated with the first position;

using the processor, receiving a second pecuniary rate associated with the second position;

using the processor, determining a first fee as a function of the first pecuniary rate and the first time period;

using the processor, determining a second fee as a function of the second pecuniary rate and the second time period; and using the processor, communicating the first fee and the second fee to a user device.

12. The method of claim 11, wherein communicating the first fee and the second fee to the user device comprises communicating a sum of the first fee and the second fee to the user device.

13. The method of claim 11, wherein at least one of the first sensor or the second sensor is a camera, an automatic broadcast receiver, or a radio receiver.

14. The method of claim 11, wherein at least one of the first sensor data or the second sensor data comprises a digitized scene of the ramp or an image of the aircraft.

15. The method of claim 11, wherein the first position comprises a non-charging position and the second position comprises a charging position.

16. The method of claim 15, further comprising executing, using the first sensor data as input, a machine-learning model to generate output indicting that the first position is the non-charging position.

17. The method of claim 11, further comprising executing, using the first sensor data as input, a machine-learning model to generate output indicting the first position.

18. The method of claim 11, wherein receiving the first sensor data comprises receiving a first subset of the first sensor data from the aircraft and receiving a second subset of the first sensor data from a sensor separate from the aircraft.

19. The method of claim 11, further comprising:

using the processor, recoding a first time datum upon the aircraft reaching the first position; and using the processor, recoding a second time datum upon the aircraft departing the first position.

20. The method of claim 19, wherein the first position comprises an electric aircraft charging station.

* * * * *